United States Patent [19]

Baji et al.

[11] Patent Number: 4,945,506

[45] Date of Patent: Jul. 31, 1990

[54] HIGH SPEED DIGITAL SIGNAL PROCESSOR CAPABLE OF ACHIEVING REALTIME OPERATION

[75] Inventors: Toru Baji, Kodaira; Hirotsugu Kojima, Tokyo; Nario Sumi, Kokubunji; Yoshimune Hagiwara, Hachioji; Shinya Ohba, Kanagawa, all of Japan

[73] Assignees: Hitachi, Ltd., Tokyo; Hitachi Device Engineering Co., Chiba, both of Japan

[21] Appl. No.: 324,830

[22] Filed: Mar. 17, 1989

[30] Foreign Application Priority Data

Mar. 18, 1988 [JP] Japan ............................ 63-63313

[51] Int. Cl.$^5$ .............................................. G06F 7/52
[52] U.S. Cl. ........................................ 364/736; 364/754
[58] Field of Search ................. 364/736, 754, 757, 726

[56] References Cited

U.S. PATENT DOCUMENTS

| | | | |
|---|---|---|---|
| 4,760,517 | 7/1988 | Miller et al. | 364/736 |
| 4,777,614 | 10/1988 | Ward | 364/754 |
| 4,787,057 | 11/1988 | Hammond | 364/754 |
| 4,811,268 | 3/1989 | Nishitani et al. | 364/754 |

OTHER PUBLICATIONS

LSI Handbook, OHM-Sha Ltd., Nov. 30, 1984, pp. 567–607.
Technical Review of the Institute of Electronic and Communication Engineers of Japan, IE85-4, 1985, pp. 23–30.

Primary Examiner—Gary V. Harkcom
Assistant Examiner—Long T. Nguyen
Attorney, Agent, or Firm—Antonelli, Terry, Stout & Kraus

[57] ABSTRACT

A digital signal processor for computing a vector product between a column vector input signal including a plurality of data items ($x_0$, $x_1$, $x_2$, ..., $x_7$) and a matrix including a predetermined number of coefficient data items so as to produce a column vector output signal including a plurality of data items ($y_0$, $y_1$, $y_2$, ..., $y_7$). In a first cycle, the leading data $x_0$ of the column vector input signal is stored in a first store unit (Rin), whereas during this period of time, in a second cycle shorter in time than the first cycle, the data items ($c_0$, $c_1$, $c_2$, ..., $c_7$) in the row direction constituting a first portion of the matrix are sequentially read out such that both data items are multiplied, thereby storing the multiplication results in an accumulator. A similar data processing is repeatedly executed so as to obtain, based on the outputs from the accumulator, a column vector output signal constituted by the plurality of data items ($y_0$, $y_1$, $y_2$, ..., $y_7$).

4 Claims, 24 Drawing Sheets

FIG. 3 PRIOR ART

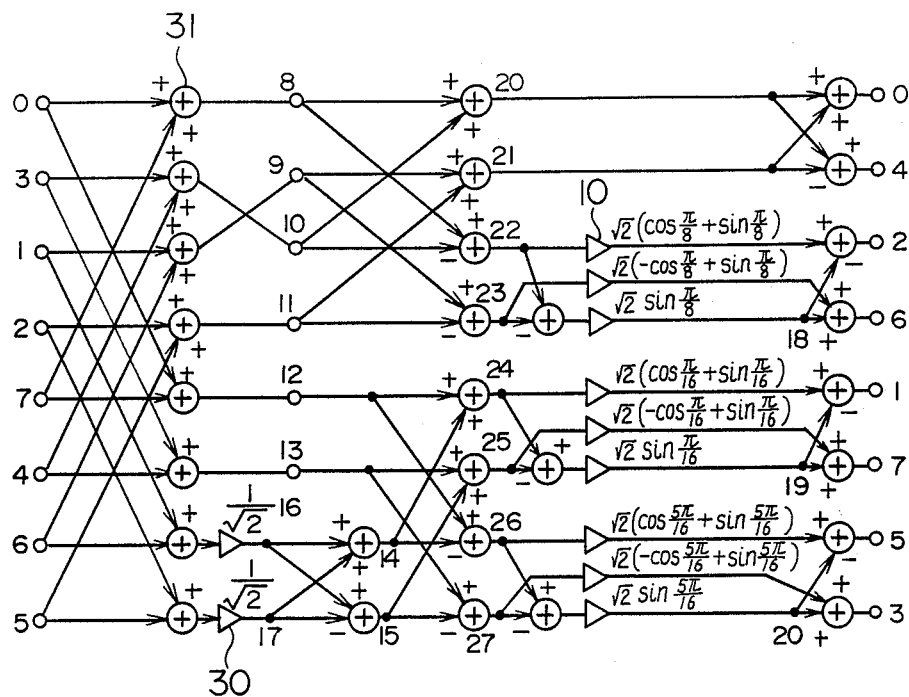

$MR\ 0 = 1/\sqrt{2}$ $MR\ 1 = \sqrt{2}\ (\cos\frac{\pi}{8} + \sin\frac{\pi}{8})$ $MR\ 2 = \sqrt{2}\ (-\cos\frac{\pi}{8} + \sin\frac{\pi}{8})$ $MR\ 3 = \sqrt{2}\ \sin\frac{\pi}{8}$ $MR\ 4 = \sqrt{2}\ (\cos\frac{\pi}{16} + \sin\frac{\pi}{16})$ $MR\ 5 = \sqrt{2}\ (-\cos\frac{\pi}{16} + \sin\frac{\pi}{16})$ $MR\ 6 = \sqrt{2}\ \sin\frac{\pi}{16}$ $MR\ 7 = \sqrt{2}\ (\cos\frac{5}{16}\pi + \sin\frac{5}{16}\pi)$ $MR\ 8 = \sqrt{2}\ (-\cos\frac{5}{16}\pi + \sin\frac{5}{16}\pi)$ $MR\ 9 = \sqrt{2}\ \sin\frac{5}{16}\pi$

FIG. 7

| STEP (WORD) | RIN | CA 10 | STZ | RAC 10 | WACE | WRE | WAC 10 | WR 10 | RR 10 | LDRO |
|---|---|---|---|---|---|---|---|---|---|---|
| 1 | 1 | 4 | | | 0 | 1 | 6 | 6 | * | 0 |
| 2 | 0 | 1 | 1 | * | 0 | 1 | 7 | 7 | * | 0 |
| 3 | 0 | 2 | 1 | ↑ | 1 | 0 | 0 | * | 0 | 1 |
| 4 | 0 | 3 | 1 | | | | 1 | * | 0 |
| 5 | 0 | 4 | 1 | | | | 2 | | |
| 6 | 0 | 5 | 1 | | | | 3 | | |
| 7 | 0 | 6 | 1 | | | | 4 | | |
| 8 | 0 | 7 | 1 | ↓ | | | 5 | | |
| 9 | 1 | 4 | 1 | | ↓ | ↓ | 6 | ↓ | ↓ | ↓ |
| 10 | 0 | 3 | 0 | 0 | | | 7 | | | |
| 11 | 0 | 6 | 0 | 1 | 1 | 0 | 0 | * | 1 | 1 |
| 12 | 0 | 9 | 0 | 2 | | | 1 | * | |
| 13 | 0 | 12 | 0 | 3 | | | 2 | | |
| 14 | 0 | 15 | 0 | 4 | | | 3 | | |
| 15 | 0 | 14 | 0 | 5 | | | 4 | | |
| 16 | 0 | 11 | 0 | 6 | | | 5 | | |
| 17 | 1 | 4 | 0 | 7 | ↓ | ↓ | 6 | ↓ | ↓ | ↓ |
| 18 | 0 | 5 | 0 | 0 | | | 7 | | | |
| ⋮ | ⋮ | ⋮ | 0 | 1 | 1 | 0 | 0 | * | 2 | 1 |
| 25 | 1 | 4 | ⋮ | ⋮ | 1 | 0 | | * | * | 0 |
| 26 | 0 | 7 | 0 | 0 | | | | | | |
| ⋮ | ⋮ | ⋮ | 0 | 1 | 1 | 0 | 0 | * | 3 | 1 |
| | | | | | 1 | 0 | 1 | * | * | 0 |
| 57 | 1 | 4 | ⋮ | ⋮ | | | | | | |
| 58 | 0 | 15 | 0 | 0 | | | | | | |
| 59 | 0 | 2 | 0 | 1 | 0 | 1 | 0 | 0 | 7 | 1 |
| 60 | 0 | 13 | 0 | 2 | 0 | 1 | 1 | 1 | * | 0 |
| 61 | 0 | 4 | 0 | 3 | 0 | 1 | 2 | 2 | | |
| 62 | 0 | 11 | 0 | 4 | 0 | 1 | 3 | 3 | | |
| 63 | 0 | 6 | 0 | 5 | 0 | 1 | 4 | 4 | | |
| 64 | 0 | 9 | 0 | 6 | 0 | 1 | 5 | 5 | | |
| 1 | | | 0 | 7 | 0 | 1 | 6 | 6 | | |
| 2 | | | | | 0 | 1 | 7 | 7 | 1 | 1 |

FIG. 8

| STEP (WORD) | RIN | RAC 10 | WAC 10 | LDR0 | WR |
|---|---|---|---|---|---|
| ① | 1 | 7 | 0 | 0 | 0 |
| 2 | 0 | 0 | 7 | 0 | 7 |
| 3 | 0 | 1 | 0 | 1 | 0 |
| 4 | 0 | 2 | 1 | 0 | 1 |
| 5 | 0 | 3 | 2 | 0 | 2 |
| 6 | 0 | 4 | 3 | 0 | 3 |
| 7 | 0 | 5 | 4 | 0 | 4 |
| 8 | 0 | 6 | 5 | 0 | 5 |
| ① | 1 | 7 | 6 | 0 | 6 |
| 2 | 0 | 0 | 7 | 0 | 7 |
| 3 | 0 | 1 | 0 | 1 | 0 |
| | b0 | b1~3 | b4~6 | b7 | b8~10 |

FIG. 9

| STEP | MACRO STEP | STZ | WACE | RR10 |
|---|---|---|---|---|
| 1 ~ 8 | 1 | 1 | 1 | 0 |
| 9 ~ 16 | 2 | 0 | 1 | 1 |
| 17 ~ 24 | 3 | 0 | 1 | 2 |
| 25 ~ 32 | 4 | 0 | 1 | 3 |
| 33 ~ 40 | 5 | 0 | 1 | 4 |
| 41 ~ 48 | 6 | 0 | 1 | 5 |
| 49 ~ 56 | 7 | 0 | 1 | 0 |
| 57 ~ 64 | 8 | 0 | 0 | 7 |
| | | b0 | b1 | b2~4 |

$$\begin{bmatrix} d_{pq} \end{bmatrix} = \begin{bmatrix} T_N \end{bmatrix} \begin{bmatrix} x_{K\ell} \end{bmatrix}^T \quad ----(1)$$

$$\begin{bmatrix} c_{ij} \end{bmatrix} = \begin{bmatrix} T_N \end{bmatrix} \begin{bmatrix} d_{pq} \end{bmatrix}^T \quad ----(2)$$

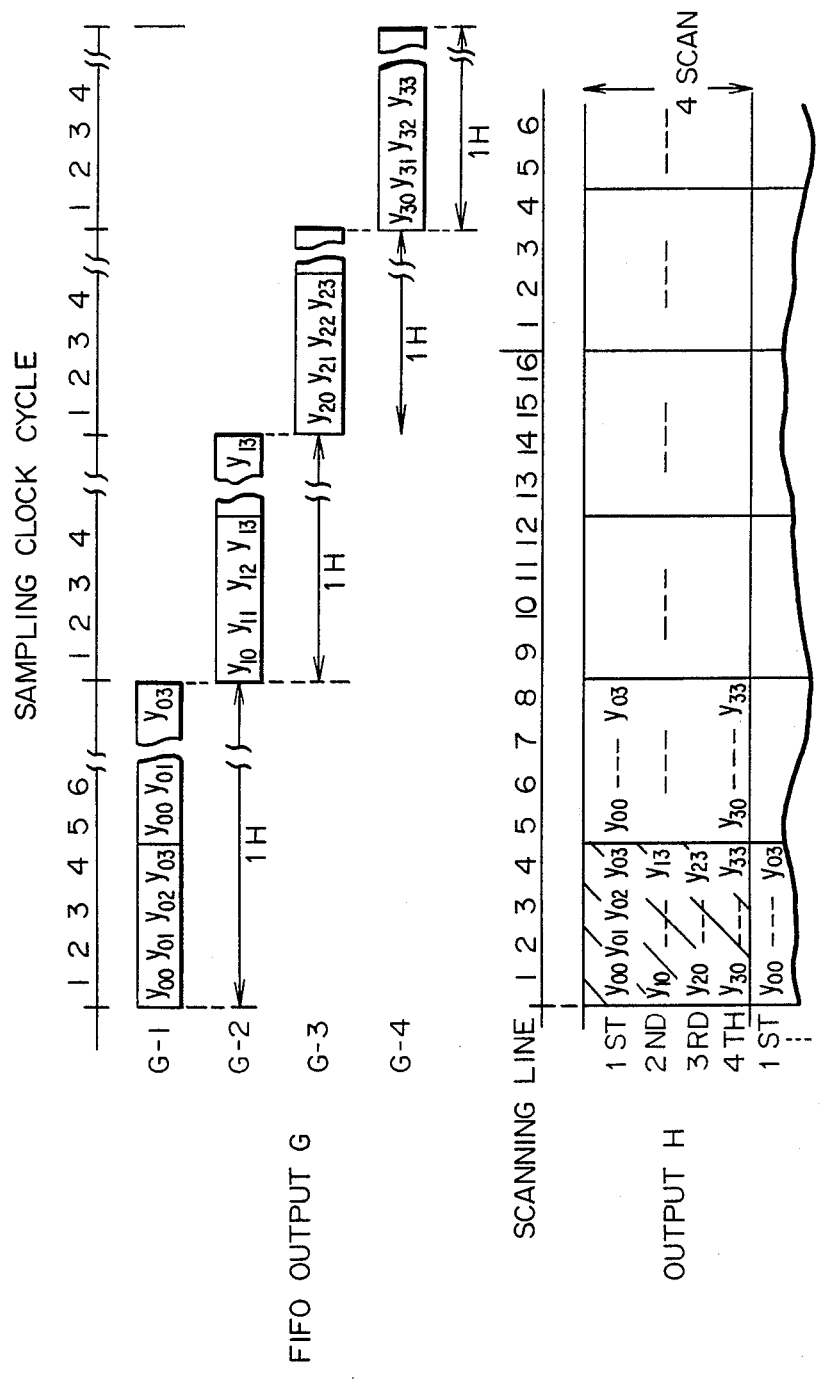

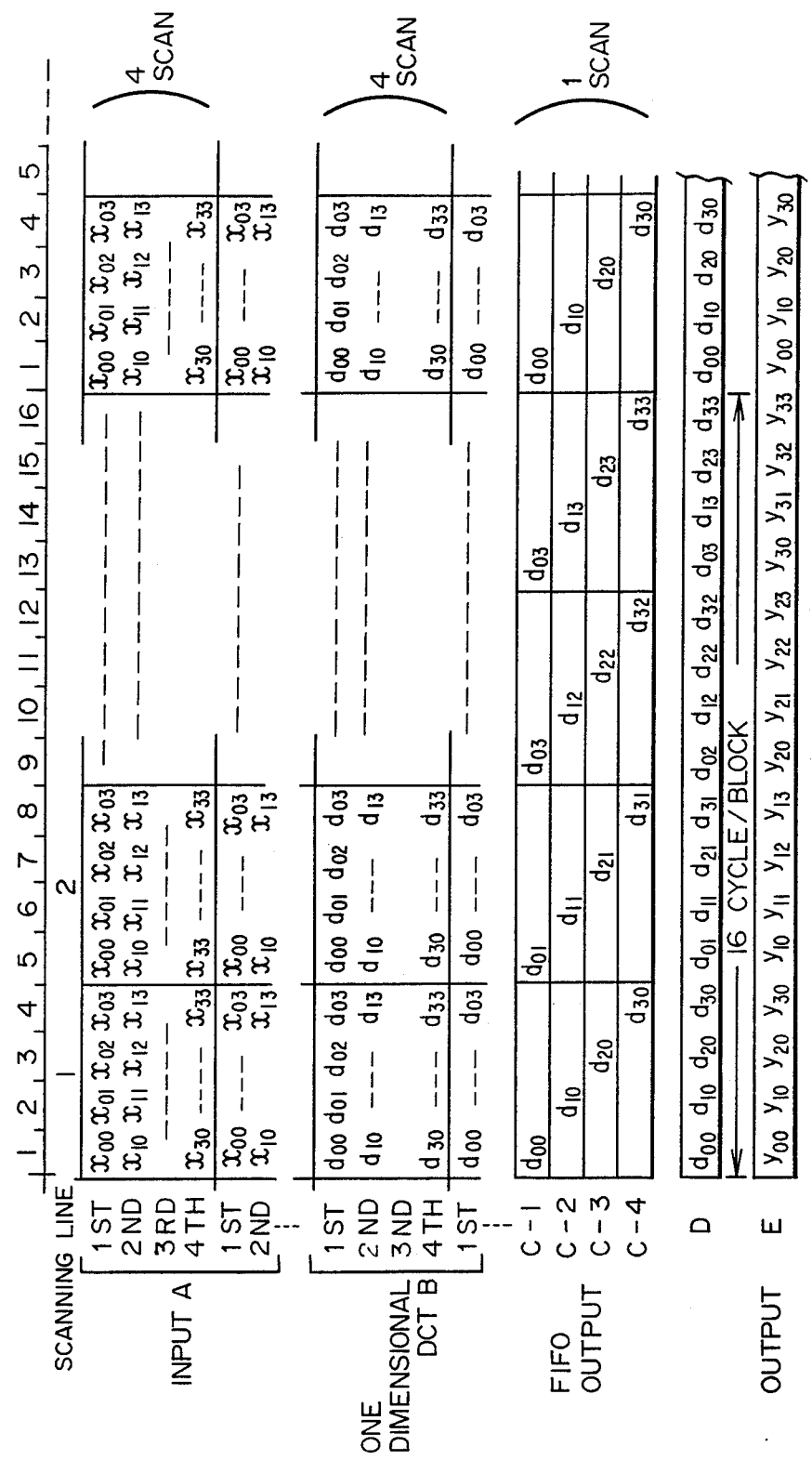

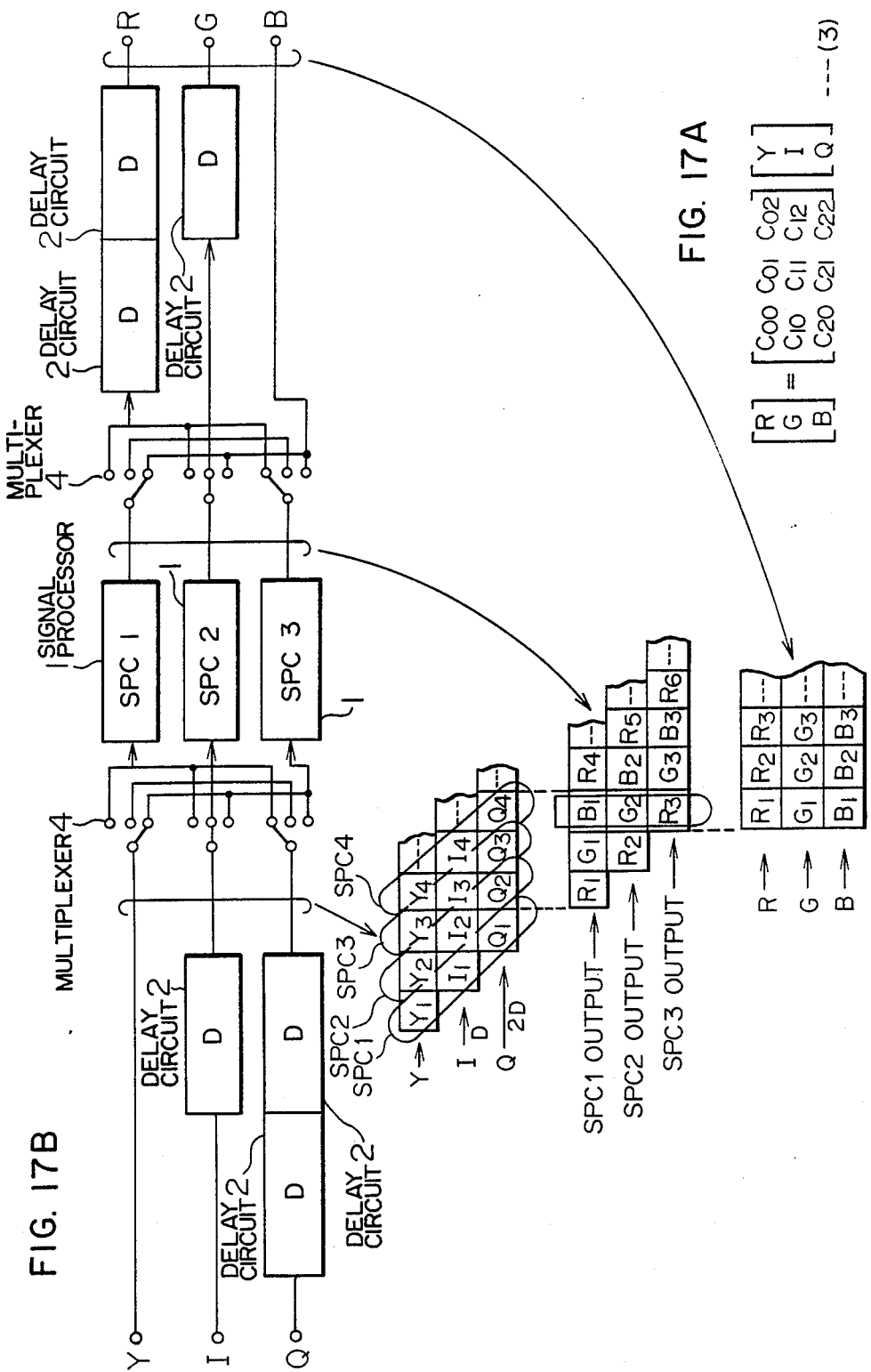

$y_0$
$y_1$
$y_2$
$y_3$

SPACE COORDINATE IN INPUT BLOCK

Y INPUT SPACE COORDINATE $y_{00}$
$y_{10}$  $y_{01}$
$y_{11}$
$y_{22}$

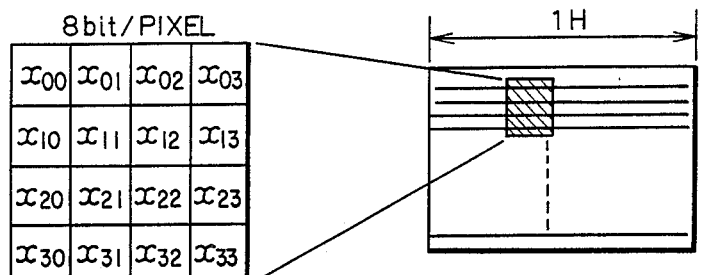

(B)

TWO-DIMENSIONAL DISCRETE COSINE TRANSLATION $$y_{ij} = \sum_{\ell=0}^{N-1} \sqrt{\frac{2}{N}} K_j \cos(\ell+\tfrac{1}{2})\frac{i\pi}{N} \left[ \sum_{k=0}^{N-1} \sqrt{\frac{2}{N}} K_i \cos(k+\tfrac{1}{2})\frac{i\pi}{N} x_{k\ell} \right]$$

$$\begin{cases} K_i = 1/\sqrt{2}, \ K_i = 1/\sqrt{2} \ ; \ i=0, j=0 \\ \quad = 1 \qquad = 1 \ ; \ i=1\sim N-1, \ j=1\sim N-1 \end{cases}$$

$$[\,y_{ij}\,] = [\,T_N\,]\bigl([\,T_N\,][\,x_{k\ell}\,]^T\bigr)^T$$

$$(T_N)_{mn} = \sqrt{\frac{2}{N}} \cdot K_m \cos\!\left(m(n+\tfrac{1}{2})\tfrac{\pi}{N}\right)$$

(C)

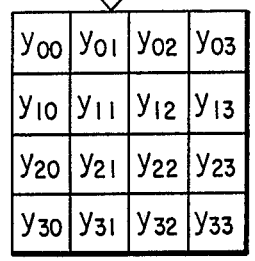 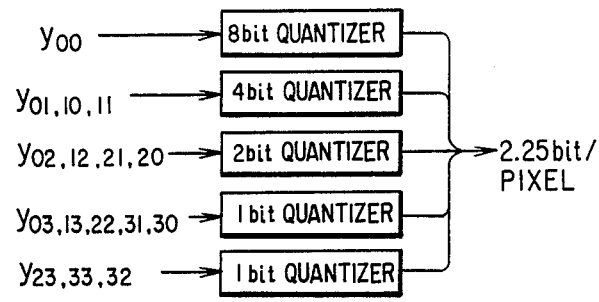

FIG. 20

$$\begin{bmatrix} y_0 \\ y_1 \\ \vdots \\ y_7 \\ y_8 \\ y_9 \\ \vdots \\ y_{15} \end{bmatrix} = \left[ \begin{array}{c|c} \text{(SPC-1)} & \text{(SPC-3)} \\ \sum_{k=1}^{7} a_{km} & \sum_{k=8}^{15} a_{km} \\ 0 \leq m \leq 7 & 0 \leq m \leq 7 \\ \hline \text{(SPC-2)} & \text{(SPC-4)} \\ \sum_{k=1}^{7} a_{km} & \sum_{k=8}^{15} a_{km} \\ 8 \leq m \leq 15 & 8 \leq m \leq 15 \end{array} \right] \begin{bmatrix} x_0 \\ x_1 \\ x_2 \\ \vdots \\ x_7 \\ x_8 \\ x_9 \\ \vdots \\ x_{15} \end{bmatrix}$$

$$a_{km} = \sqrt{\frac{2}{N}} \, K_m \cos\left(k + \frac{1}{2}\right) \frac{m}{N} \pi$$

$$N = 16$$

$$K_m = \begin{cases} 1/\sqrt{2}, & m = 0 \\ 1, & m = 1, 2, 3 \cdots 15 \end{cases}$$

HIGH SPEED DIGITAL SIGNAL PROCESSOR CAPABLE OF ACHIEVING REALTIME OPERATION

BACKGROUND OF THE INVENTION

The present invention relates to a circuit configuration of a high speed digital signal processor achieving a realtime operation. The processor is applicable primarily to such fields as a video communication, high-definition digital television, and video signal processing.

Details concerning a digital signal processor have been described, for example, on pages 567 to 607 of the "LSI Handbook" published on Nov. 30, 1984 from OHM-Sha Ltd.

A digital signal processor is generally defined as a device in which digitized audio or video signals are processed or transformed by digital arithmetic circuits.

The digital operations performed by the digital signal processor include, for example, filtering, equalizing, noise reduction, echo cancellation, modulation, Fourier transformation, extraction of characteristic parameters of the signal, prediction of the signal, and emphasis of the video signal.

A signal outputted from the digital signal processor is restored through a digital-to-analog conversion to an analog signal, which is then fed to a low-pass filter to obtain a final output signal.

In 1980s, large scale integration (LSI) technology has been developed and there has been proposed application of specific LSIs in which the basic components of the digital signal processing, such as adders, multipliers, and unit delay registers, are arranged according to the signal processing flow of the specific application. Since the circuit size of the application specific to the custom LSI can be minimized, this is the most cost effective way when the LSIs are put to the mass production.

On the other hand, there has been proposed in late 1980s an LSI of a digital signal processor (to be referred to as DSP herebelow) which is controlled by a stored program. Since the algorithm of the signal processing is programmed using micro-instructions of the LSI such that the micro-instructions are read out from a memory so as to accomplish the algorithm, the LSI possesses a general-purpose characteristic. Various signal processing can be performed by programming this general-purpose DSP.

Incidentally, for a video signal compression in video communication, an orthogonal transformation, particularly, a discrete cosine transformation has been regarded as a potential candidate. A transformation equation is represented as follows, where $\{x_k\}$ and $\{y_k\}$ are inputs and outputs, respectively; and N stands for a block size of the data to be transformed.

$$y_m = \sum_{k=1}^{N-1} \sqrt{\frac{2}{N}} \, K_m \cos\left(k + \frac{1}{2}\right) \cdot \frac{m}{N} \pi \cdot x_k \tag{1}$$

$$K_m = \begin{cases} 1/\sqrt{2}, & m = 0 \\ 1, & m = 1, 2, 3 \ldots N-1 \end{cases}$$

The 8th order transformation (N=8) of equation (1) can be expressed in a matrix notation as shown in equation (2). Taking the periodic characteristic of the trigonometric functions into consideration, there appear only 15 kinds of coefficients, namely; $C_1$ to $C_{15}$ to be multiplied by the inputs $\{x_k\}$.

$$\begin{bmatrix} y_0 \\ y_1 \\ y_2 \\ \vdots \\ y_7 \end{bmatrix} = \sqrt{\frac{2}{8}} \begin{bmatrix} 1/\sqrt{2} & 1/\sqrt{2} & 1/\sqrt{2} & \cdots & 1/\sqrt{2} & 1/\sqrt{2} \\ \cos\frac{1}{2}\cdot\frac{x}{8} & \cos\frac{3}{2}\cdot\frac{x}{8} & \cos\frac{5}{2}\cdot\frac{x}{8} & \cdots & \cos\frac{13}{2}\cdot\frac{x}{8} & \cos\frac{15}{2}\cdot\frac{x}{8} \\ \cos\frac{1}{2}\cdot\frac{2x}{8} & \cos\frac{3}{2}\cdot\frac{2x}{8} & \cos\frac{5}{2}\cdot\frac{2x}{8} & \cdots & \cos\frac{13}{2}\cdot\frac{2x}{8} & \cos\frac{15}{2}\cdot\frac{2x}{8} \\ \vdots & \vdots & \vdots & & \vdots & \vdots \\ \cos\frac{1}{2}\cdot\frac{7x}{8} & \cos\frac{3}{2}\cdot\frac{7x}{8} & \cos\frac{5}{2}\cdot\frac{7x}{8} & & \cos\frac{13}{2}\cdot\frac{7x}{8} & \cos\frac{15}{2}\cdot\frac{7x}{8} \end{bmatrix} \begin{bmatrix} x_0 \\ x_1 \\ x_2 \\ \vdots \\ x_7 \end{bmatrix} \tag{2}$$

$$\begin{bmatrix} y_0 \\ y_1 \\ y_2 \\ y_3 \\ y_4 \\ y_5 \\ y_6 \\ y_7 \end{bmatrix} = \sqrt{\frac{2}{8}} \begin{bmatrix} C_4 & C_4 & C_4 & C_4 & C_4 & C_4 & C_4 & C_4 \\ C_1 & C_3 & C_5 & C_7 & C_9 & C_{11} & C_{13} & C_{15} \\ C_2 & C_6 & C_{10} & C_{14} & C_{14} & C_{10} & C_6 & C_2 \\ C_3 & C_9 & C_{15} & C_{11} & C_{11} & C_1 & C_7 & C_{13} \\ C_4 & C_{12} & C_{12} & C_4 & C_4 & C_{12} & C_{12} & C_4 \\ C_5 & C_{15} & C_7 & C_3 & C_3 & C_9 & C_1 & C_{11} \\ C_6 & C_{14} & C_2 & C_{10} & C_{10} & C_2 & C_{14} & C_6 \\ C_7 & C_{11} & C_3 & C_1 & C_1 & C_{13} & C_{11} & C_9 \end{bmatrix} \begin{bmatrix} x_0 \\ x_1 \\ x_2 \\ x_3 \\ x_4 \\ x_5 \\ x_6 \\ x_7 \end{bmatrix} \quad \text{where, } C_i = \cos\frac{i\pi}{16} \, (i = 1\sim15) \tag{3}$$

Direct circuit implementation of equation (3) is shown in FIG. 2. This includes $8\times8=64$ multipliers 10 and $8\times7=56$ adders 11, if each of the adders allow only an addition of two inputs. In this situation, heretofore, as described in pages 23 to 30 of the Technical Review of the Institute of Electronic and Communication Engineers of Japan, IE85-4, 1985, the formula (3) is mathematically transformed so as to adopt a computation algorithm of FIG. 3. As a result, the numbers of the multipliers 30 and adders 31 are reduced to 11 and 29, respectively.

Incidentally, due to a recent advance in digital signal processors, it becomes possible to implement the algorithm shown in FIG. 3 using only a pair of elements comprising an adder and a multiplier. Here an adder and a multiplier are used in a time-shared fashion and the signal flow is controlled by a stored program.

FIG. 4 shows a digital signal processor (DSP) which develops a relatively high-speed operation and which includes a 4-port memory 12 and two data buses. This system has been discussed by the present inventors before the filing of this application. Table 1 shows a program which processes the algorithm of FIG. 3 by use of the processor. However, since the signal flow of this algorithm is irregular, high-speed processing techniques, such as a pipeline processing, are difficult. Therefore 29 steps are required for the data calculation alone. For the input/output operations of the data memory 12, eight steps are required even if the multiport operation of the memory 12 is taken into consideration. As a result, 29+8=37 steps are to be executed for a complete data processing. In addition, during the data calculation, the input/output operations are stopped. Therefore, the operation to match the input and output rates, which is achieved in the case of pipeline processing, cannot be realized. That is, a processing period of time of 37 steps is necessary. The machine cycle (the processing time for one step) of a processor having a gate length of about 1 μm is at most 10 ns, and hence at most 370 ns is required for a sample, and the upper limit of the frequency is 2.7 MHz. Under this condition, a real-time video signal (14.3 MHz to 7.15 MHz) cannot be processed.

TABLE 1

| STEP | PROGRAM | | | |
|---|---|---|---|---|
| 1 | RA=MA0 | | | |
|   | RB=MA7 | | | |
| 2 | RA=MA1 | ACC=RA+RB | | |
|   | RB=MA6 | | | |
| 3 | RA=MA3 | ACC=RA+RB | | MA8=ACC |
|   | RB=MA4 | | | |
| 4 | RA=MA2 | ACC=RA+RB | | MA9=ACC |
|   | RB=MA5 | | | |
| 5 | RA=MA1 | ACC=RA+RB | | MA10=ACC |
|   | RB=MA6 | | | |
| 6 | RA=MA2 | RC=RA−RB | | MA11=ACC |
|   | RB=MA5 | RD=MR0 | | |
| 7 | RA=MA8 | RC=RA−RB | RE=RC*RD | |
|   | RB=MA10 | RD=MR0 | | |
| 8 | RA=MA9 | ACC=RA+RB | RE=RC*RD | MA16=RE |
|   | RB=MA11 | | | |
| 9 | RA=MA8 | ACC=RA+RB | | MA17=RE |
|   | RB=MA10 | | | MA0=ACC |
| 10 | RA=MA9 | ACC=RA−RB | | MA21=ACC |
|   | RB=MA11 | | | |
| 11 | RA=MA12 | ACC=RA−RB | | MA22=ACC |
|   | RB=MA14 | | | |
| 12 | RA=MA13 | ACC=RA+RB | | MA23=ACC |
|   | RB=MA15 | | | |
| 13 | RA=MA12 | ACC=RA+RB | | MA24=ACC |
|   | RB=MA14 | | | |
| 14 | RA=MA13 | ACC=RA−RB | | MA25=ACC |
|   | RB=MA15 | | | |
| 15 | RA=MA20 | ACC=RA−RB | | MA26=ACC |
|   | RB=MA21 | | | |
| 16 | RA=MA20 | ACC=RA+RB | | MA27=ACC |
|   | RB=MA21 | | | |
| 17 | RA=MA22 | ACC=RA−RB | | MA0=ACC |
|   | RB=MA23 | | | |
| 18 | RA=MA24 | RC=RA−RB | | MA4=ACC |
|   | RB=MA25 | RD=MR3 | | |
| 19 | RA=MA26 | RC=RA−RB, | RE=RC*RD | |
|   | RB=MA17 | RD=MR6 | | |
| 20 | | RC=RA−RB, | RE=RC*RD, | MA18=RE |
|   | | RD=MR9 | | |
| 21 | RC=MA22 | | RE=RC*RD, | MA19=RE |
|   | RD=MR1 | | | |
| 22 | RC=MA23 | | RA=RC*RD, | MA20=RE |
|   | RD=MR2 | | RB=MA18 | |
| 23 | RC=MA24 | ACC=RA−RB, | RA=RC*RD | |
|   | RB=MA4 | | RB=MA18 | |
| 24 | RC=MA25 | ACC=RA+RB, | RA=RC*RD, | MA2=ACC |
|   | RD=MA5 | | RB=MA19 | |
| 25 | RC=MA26 | ACC=RA−RB, | RA=RC*RD, | MA6=ACC |
|   | RB=MA7 | | RB=MA19 | |
| 26 | RC=MA27 | ACC=RA+RB, | RA=RC*RD, | MA1=ACC |
|   | RB=MA8 | | RB=MA20 | |
| 27 | | ACC=RA−RB, | RA=RC*RD, | MA7=ACC |
|   | | | RB=MA20 | |
| 28 | | ACC=RA+RB | | MA5=ACC |
| 29 | | | | MA3=ACC |

The above technology discussed by the present inventors prior to the filing of this application is subject to the problem that the object of the computing algorithm is placed only on the reduction of the number of additions and multiplications and that the usage of the DSP is not taken into consideration. The algorithm above is irregular and is hence not inherently suitable for high-speed DSP operation.

SUMMARY OF THE INVENTION

An object of the present invention is to implement a high-speed processing method suitable for a DSP in consideration of the original definition of the discrete cosine translation.

The problem above is solved by converting the signal flow of FIG. 2 into a signal processing algorithm of FIG. 5. The signal processing is completely identical to the expression (3). However, there is provided a practical configuration in which the input signals $\{x_k\}$ are here not simultaneously but sequentially supplied. In this algorithm, input data $x_0$ is first multiplied by associated coefficients $\{c_i\}$ at the same time that the results are passed to an accumulation circuit 17 including an adder 11 and a delay circuit 15. For the next data $x_1$, the multiplication is similarly conducted so as to deliver the results to the accumulation circuit 17. After the processing is sequentially achieved up to data $x_7$, the accumulation circuits 17 simultaneously transfer the results to latch circuits 16. Thereafter, the contents of the accumulators are cleared and then control proceeds to the processing of the next sequence of data items $\{x_k\}$ (k=0 to 7). At the same time, output data $\{y_k\}$ (k=0 to 7) is sequentially read from the latch 16 at a timing associated with the input operation. According to this method, there are employed eight multipliers and eight adders, which greatly reduces the number of circuits as compared with the algorithm of FIG. 3.

FIG. 1 is the circuit configuration of the processor which can implement the operation of FIG. 5 most effectively. In this constitution, the input signals $\{x_k\}$ with a sampling period T are supplied to a multiplier circuit 10. At the same time, coefficients $\{c\}$ to be multiplied by the input signals $\{x_k\}$ are read from a coefficient memory 4 with a cycle of $T \times 1/N$ such that the result obtained through the multiplication is supplied to the adder 11 with a period of T/N. By data exchanging with an accumulator 8, the adder 11 performs the accumulation in accordance with the signal processing algorithm of FIG. 5. When a block (including N sampling data) is completely processed, the result is passed to a buffer circuit 9 so as to deliver outputs at a speed corresponding to the input period of time T.

BRIEF DESCRIPTION OF THE DRAWINGS

These and other objects and advantages of the present invention will become apparent by reference to the following description and accompanying drawings wherein:

FIGS. 2 and 3 are diagrams schematically showing conventional signal processing algorithms;

FIG. 7 is a schematic diagram showing a processing program employed in the embodiment according to the present invention;

FIGS. 8 and 9 are schematic diagrams showing microcodes respectively of a control memory and a macro step control memory employed in the embodiment according to the present invention;

FIGS. 15A and 15B are explanatory diagrams useful to explain operations associated with the 2 dimensional DCT operation;

FIGS. 16A and 16B respectively are a block diagram and an operation explanatory diagram for still another embodiment according to the present invention;

FIGS. 17A and 17B respectively are a block diagram and an operation explanatory diagram of still an alternative embodiment according to the present invention;

FIGS. 18A, 18B, 19A, 19B, 19C and 20 are explanatory diagrams useful to explain the DCT operation;

DESCRIPTION OF THE PREFERRED EMBODIMENTS

Figure 1:
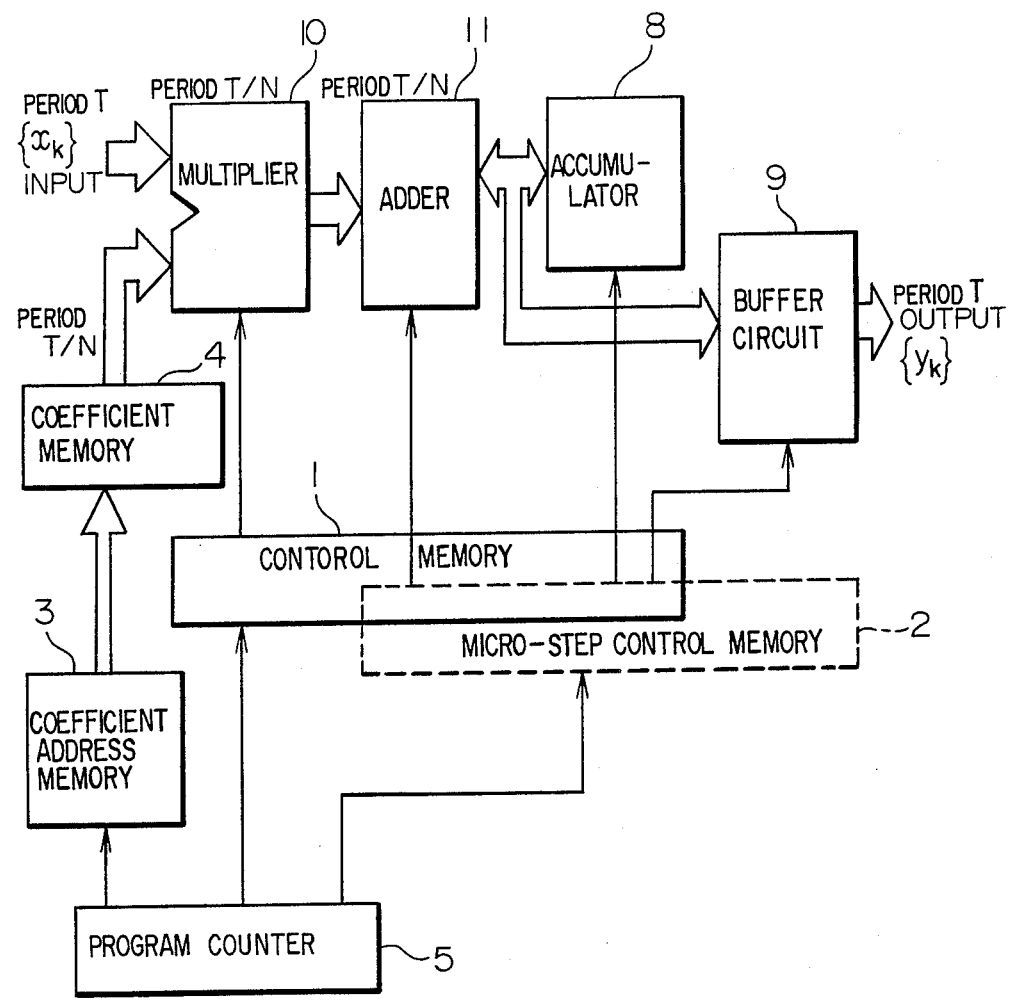
FIG. 1 is a schematic block diagram showing a configuration of a processor as an embodiment according to the present invention.
Figure 2:
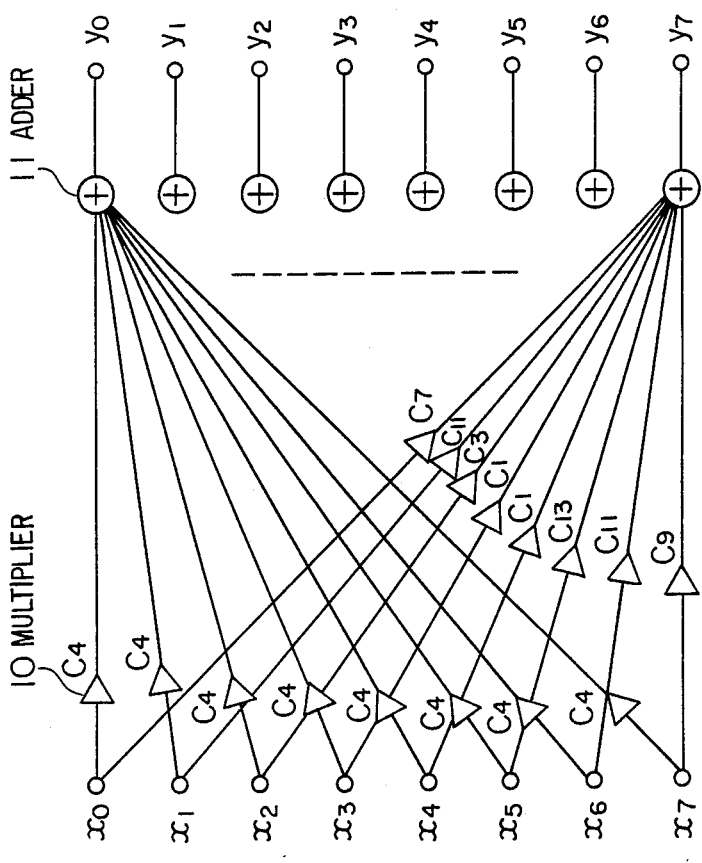
Figure 4:
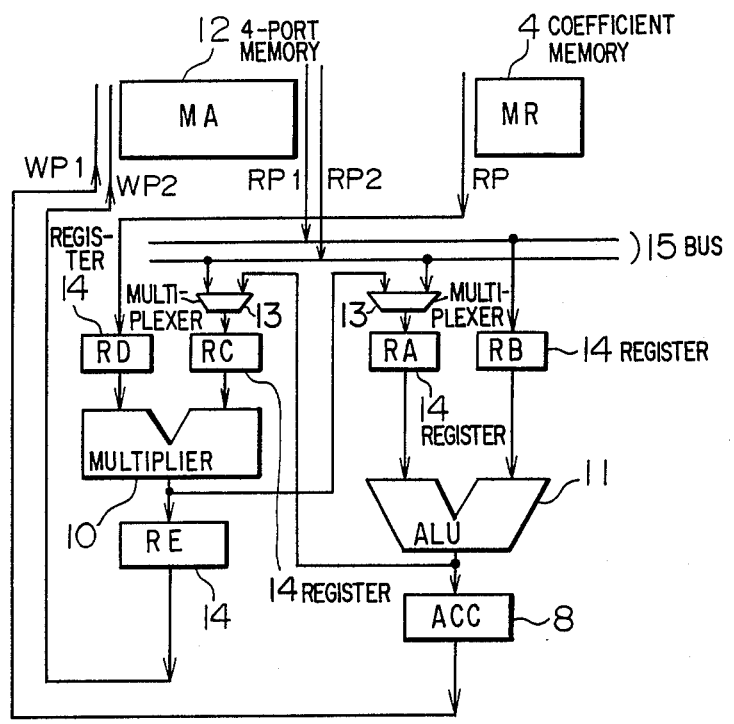
FIG. 4 is a block diagram of a processor discussed by the present inventors prior to the filing of the present application.
Figure 6:
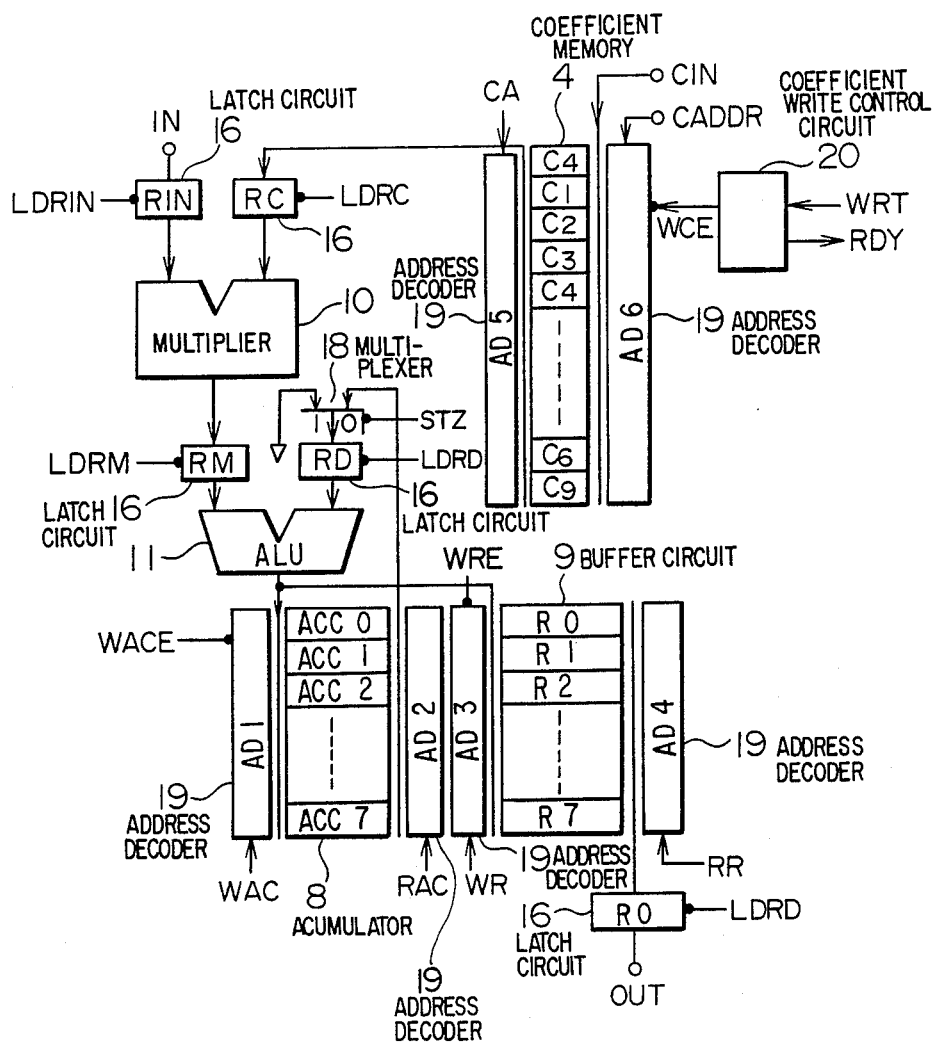
FIG. 6 is a schematic block diagram showing a implemented by specifically developing the configuration of FIG. 1.

FIG. 6 shows an embodiment according to the present invention. This is obtained by specifically developing the circuit configuration of FIG. 1, whereas Table 2 shows a program to execute the processing of the circuit of FIG. 6. Incidentally, for each block of the input data to be processed, the sampling count N is set to eight. In order to also cope with an adaptive conversion, a two-port memory is selected for the coefficient memory 4, namely, the input and the output port are separated from each other. A write control signal WCE is supplied by a coefficient write control circuit 20 as follows. In a case where a write operation is desired to be effected from an external device, a signal '1' is inputted to the WRT terminal. In response to this input, the write signal WCE is generated at a timing for which the input and output addresses of the memory 4 do not overlap with each other; thereafter, a signal '1' is outputted as a write end signal to the RDY terminal. In response thereto, when the WRT signal is set to '0', the RDY signal is also turned to '0'.

TABLE 2

| STEP | PROGRAM | | | |
|---|---|---|---|---|
| ① | RIN=x0 | | | |
|  | RC=C4 | | | |
| 2 | RC=C1 | RM=RIN*RC | | |
|  |  | RD=0 | | |
| 3 | RC=C2 | RM=RIN*RC | ACC0=RM+RD | R0=R0 |
|  |  | RD=0 | | |
| 4 |  | RM=RIN*RC | ACC1=RM+RD | |

TABLE 2-continued

| STEP | | PROGRAM | | |
|---|---|---|---|---|
| 5 | RC=C3 | RD=0 | | |
|   |       | RM=RIN*R | ACC2=RM+RD | |
| 6 | RC=C4 | RD=0 | | |
|   |       | RM=RIN*RC | ACC3=RM+RD | |
| 7 | RC=C5 | RD=0 | | |
|   |       | RM=RIN*RC | ACC4=RM+RD | |
| 8 | RC=C6 | RD=0 | | |
|   |       | RM=RIN*RC | ACC5=RM+RD | |
| ⑨ | RC=C7 | RD=0 | | |
|   | RIN=x1 | RM=RIN*RC | ACC6=RM+RD | |
| 10 | RC=C4 | RD=0 | | |
|    |       | RM=RIN*RC | ACC7=RM+RD | |
| 11 | RC=C3 | RD=ACC0 | | |
|    |       | RM=RIN*RC | ACC0=RM+RD | R0=R1 |
|    | RC=C6 | RD=ACC1 | | |
|    |       | RM=RIN*RC | ACC1=RM+RD | |
|    | . | RD=ACC2 | | |
|    | . | .        | ACC2=RM+RD | |
| 17 | RIN=x2 | . | | |
|    | RC=C4 | . | | |
| 18 |       | RM=RIN*RC | . | |
|    | RC=C5 | RD=ACC0 | . | |
|    |       | RM=RIN*RC | ACC0=RM+RD | R0=R2 |
|    |       | RD=ACC1 | . | |
| ㉕ | RIN=x3 | . | ACC1=RM+RD | |
|    | RC=C4 | . | | |
| 26 |       | RM=RIN*RC | . | |
|    | RC=C7 | RD=ACC0 | . | |
|    |       | RM=RIN*RC | ACC0=RM+RD | R0=R3 |
|    |       | RD=ACC1 | . | |
| ㉝ | RiN=x4 | . | ACC1=RM+RD | |
|    | RC=C4 | . | | |
| 34 |       | RM=RIN*RC | . | |
|    | RC=C9 | RD=ACC0 | . | |
|    |       | RM=RIN*RC | ACC0=RM+RD | R0=R4 |
|    |       | RD=ACC1 | . | |
| ㊶ | RIN=x5 | . | ACC1=RM+RD | |
|    | RC=C4 | . | | |
| 42 |       | RM=RIN*RC | . | |
|    | RC=C11 | RD=ACC0 | . | |
|    |       | RM=Rin*RC | ACC0=RM+RD | R0=R5 |
|    |       | RD=ACC1 | . | |
| ㊾ | RIN=x6 | . | ACC1=RM+RD | |
|    | RC=C4 | . | | |
| 50 |       | RM=RIN*RC | . | |
|    | RC=C13 | RD=ACC0 | . | |
|    |       | RM=RIN*RC | ACC0=RM+RD | R0=R6 |
|    |       | RD=ACC0 | . | |
| ㊼ | RIN=x7 | . | ACC1=RM+RD | |
|    | RC=C4 | . | | |
| 58 |       | RM=RIN*RC | . | |
|    | RC=C15 | RD=ACC0 | | |
| 59 |       | RM=RIN*RC | R0=RM+RD | R0=R7 |
|    | RC=C2 | RD=ACC1 | | |
|    |       | RM=RIN*RC | R1=RM+RD | |
|    | . | RD=ACC2 | | |
| 64 | . | . | R2=RM+RD | |
|    | RC=C9 | | | |
| ① | RIN=x8 | RM=RIN*RC | | |

TABLE 2-continued

| STEP | | PROGRAM | | |
|---|---|---|---|---|
|   | RC=C4 | RD=ACC7 | | |
| 2 |       | RM=RIN*RC | R7=RM+RD | |
|   | RC=C1 | RD=0 | | |
| 3 |       | RM=RIN*RC | ACC0=RM+RD | R0=R0 |
|   | RC=C2 | RD=0 | | |

The accumulator 8 includes eight master/slave registers, which enable simultaneous read and write operations without destroying data stored therein. The buffer circuit 9 also comprises eight master/slave registers. The multiplexer 18 is adapted to input a '0' signal to a terminal of a latch RD depending on a Set to Zero (STX) signal.

Figure 5:
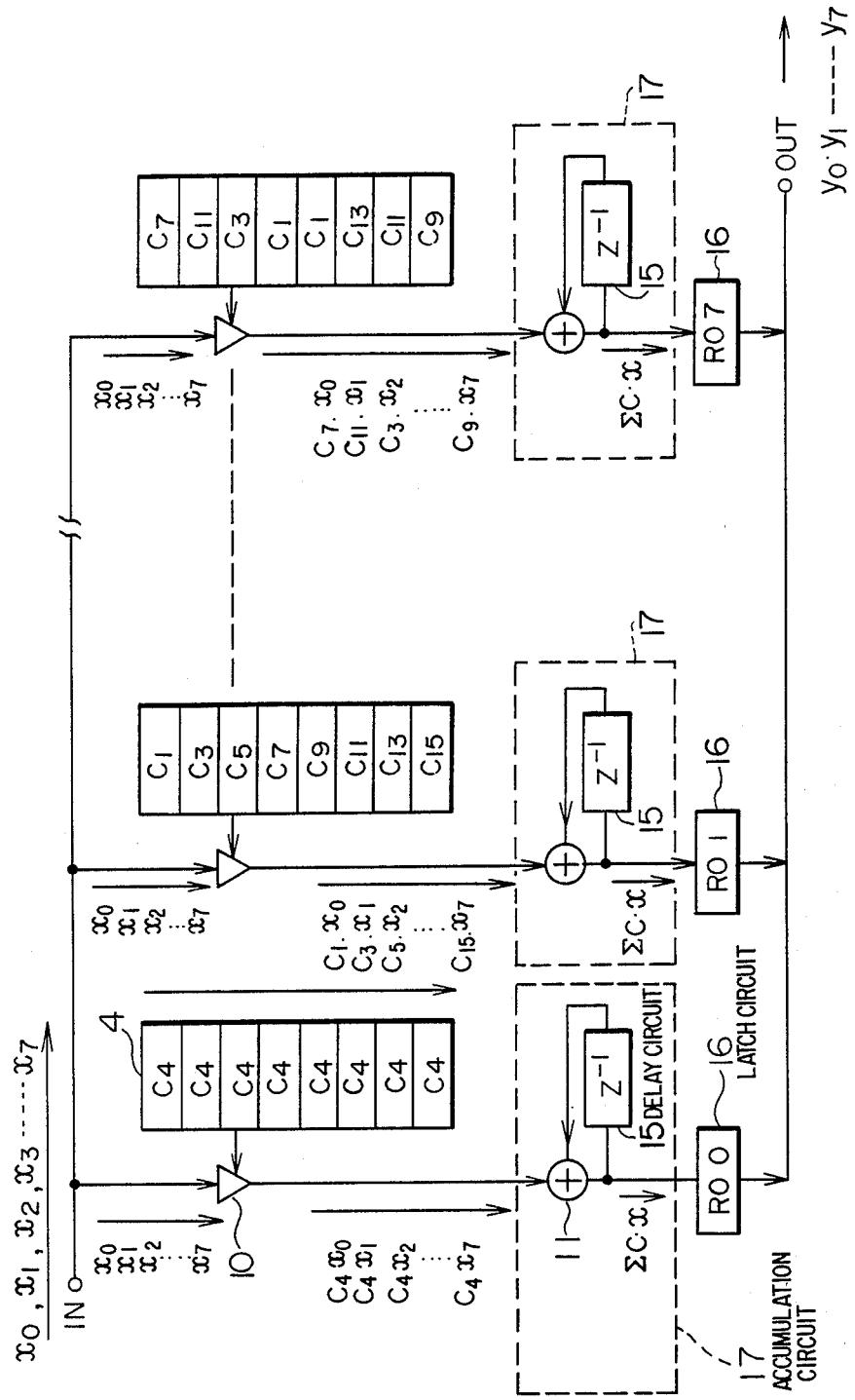
FIG. 5 is a diagram schematically showing a signal processing algorithm according to the present invention.

The operation controlling the circuit above will be described with reference to Table 2. In the first step, when the input data x0 is fetched into an input latch RIN, the coefficient C4 to be multiplied by the input data x0 is simultaneously loaded into a coefficient latch RC. In the second step, the result of the multiplication is supplied to a multiplication result latch RM. At the same time, the next coefficient C1 is loaded in RC, whereas '0' is fetched into the data latch RD. In the third step, the result of the addition RM+RD is loaded in the first register ACC0 of the accumulator 8. Simultaneously, the previous data beforehand processed is passed from the register R0 of the buffer circuit 9 to an output latch RO. In the subsequent processing, up to the ninth step, parallel operations of the multiplier, the adder, and the buffer circuit are executed so as to achieve a pipeline processing. In the ninth step, the next input signal x1 is latched into RIN. And then the multiplication is sequentially executed with the coefficients {C4, C3, C6, ... } and the results are respectively accumulated to the data of {ACC0, ACC1, ACC2, ... }. Subsequently, the processing is executed in a similar fashion up to step 57. The accumulation results obtained in the step 57 and subsequent steps are not returned to the accumulator 8, namely, the results are directly written in the buffer 9. The contents of the buffer 9 are read therefrom in the next 64 cycles at an interval of eight steps. In this fashion, a real-time processing is conducted on the input signals Furthermore, the algorithm of FIG. 5 is implemented by use of only one set of a multiplication circuit 10 and an adder circuit 11. The processing period of time of these circuits is 1/N of the input sampling time, for example, employing a CMOS logic circuit having a gate length of 0.8 $\mu$m, the processing speed of an 8×8 bits parallel multiplier circuit is around ten nanoseconds. In contrast thereto, since the input sampling time is at most 140 ns, it is possible to develop processing for up to N=14, which sufficiently copes with the practical use.

In this situation, a point to be improved is the program redundancy. The program above possesses a periodicity of eight steps, and an exceptional processing thereof includes only the portions shaded in Table 2. In order to clarify this fact, FIG. 7 shows bit codes of the program. In this diagram, the shaded portions indicate the exceptional processing which does not conform to the processing of the 8-step periodicity. The contents of the exceptional processing are associated with an STZ signal to set the latch RD to '0', a WAC signal to write data in the accumulator 8, and a WRE signal to write data in the buffer circuit 9. Under these conditions, only the exceptional processing programs are extracted as microcodes of FIG. 9 such that the processing of the 8-step periodicity is controlled by the microcodes of FIG. 8. Incidentally, the microcodes of FIG. 9 undergo an incrementation each time eight steps have elapsed.

Figure 10:
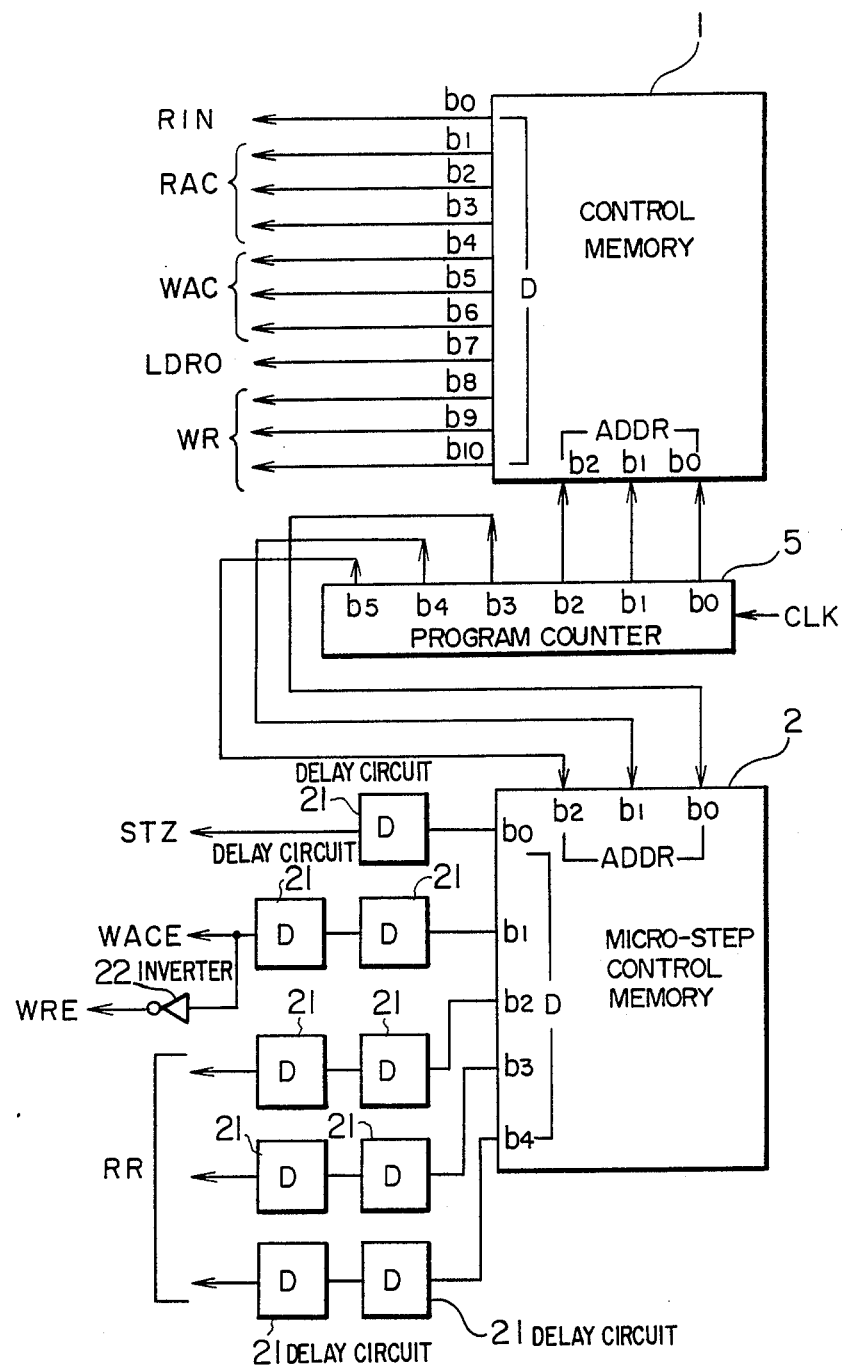
FIG. 10 is a schematic diagram showing a control circuit used in the embodiment according to the present invention.

FIG. 10 shows a method of constituting a control memory containing the microcodes discussed above. A control memory 1 effects an incrementation for each machine cycle when an access is conducted thereto by use of three low-order bits of a program counter 5. In contrast thereto, a macro step control memory 2 effects an incrementation each time the periodic eight steps are executed therein when an access is made by use of the high-order three bits of the counter. From the macro step control memory 2, there are generated the STZ, WRE, and WACE signals as well as an address RR on the buffer register for the signal to be passed from the buffer 9 to the output register. However, since the processor is operated in a pipeline fashion, the output from the macro step control memory 2 is delayed by a predetermined number of steps by use of a one-machine cycle delay circuit 21 so as to conform to the sequence of FIG. 7.

In addition to the control memories discussed above, the coefficient memory 4 also is provided with the redundancy. In the circuit of FIG. 6, there are required 64 words for the coefficient memory 4. However, the content written therein takes only 16 different values due to the periodicity of the coefficients. As a consequence, for the purpose of reducing the memory capacity, there is adopted a coefficient address memory 3 of FIG. 11. The coefficient memory includes only 16 words, whereas the coefficient address memory 3 is used to store all of the sequence of 64 words. However, in contrast to a fact that eight to 32 bits are assigned for a word associated with the coefficients, only four bits are used for the address information thereof, which means that the memory capacity is greatly reduced.

The processing method and the processor architecture discussed above is applicable not only to discrete cosine transformation but also to a high-speed multiplication between a further general matrix and an input vector, which enables, as a result, a matrix computation of color video signals, high speed coordinate transformation for a robot control as well as for 2-dimensional and 3-dimensional graphics, and a high-speed Fourier transformation.

Incidentally, two-dimensional discrete cosine transformation (to be abbreviated as 2D-DCT herebelow) is a key technology for the type of video signal compression employed in video communication. The 2D-DCT will be briefly described with reference to FIGS. 18A, 18B, and 19. In a one-dimensional DCT operation, as shown in FIG. 18A, the respective signals $\{x_k\}$ of the input signal block are subjected to a translation as follows.

$$y_m = \sum_{k=0}^{N-1} \sqrt{\frac{2}{N}} K_m \cos\left(k + \frac{1}{2}\right)\frac{m}{N} \pi \cdot x_k$$

$$K_m = \begin{cases} 1/\sqrt{2} & (m = 0) \\ 1 & (m = 1, 2, 3 \ldots N - 1) \end{cases}$$

Figure 18A:
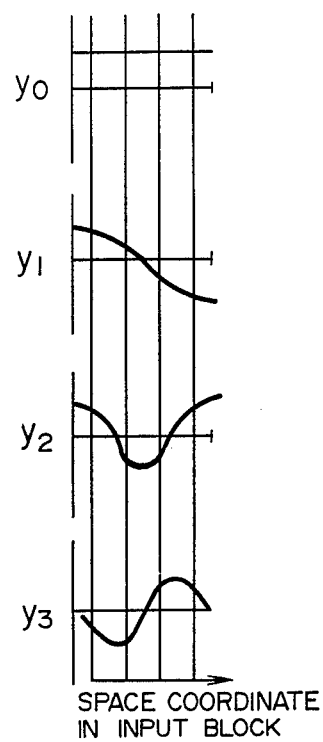
Figure 18B:
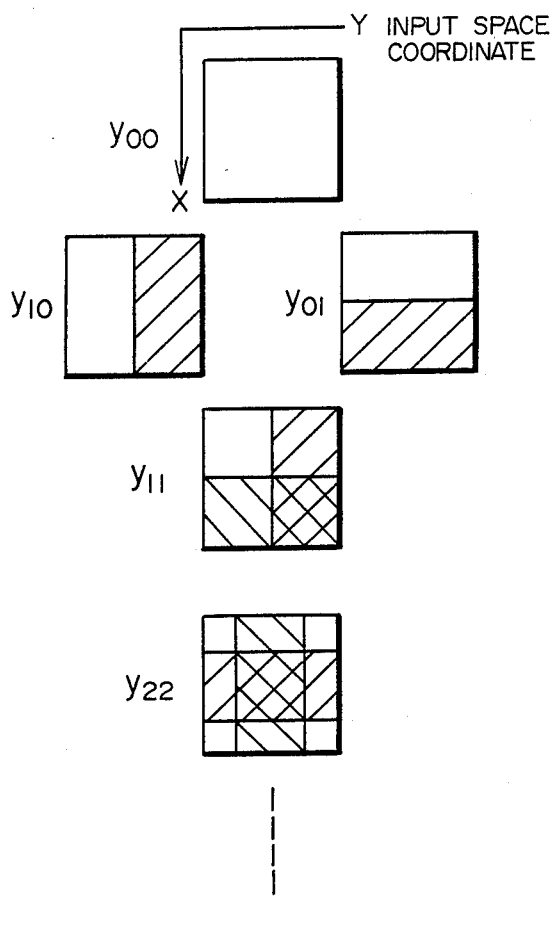

FIG. 18A schematically shows the operation of this transformation. Expansion into a two-dimensional form is shown in FIG. 18B. As the output $y_{00}$ of the (00) index a constant is multiplied for all pixels in in the image-signal block to be transformed. As the output $y_{10}$ of the (10) index a cosine weight is multiplied only in the x direction; in consequence, the 2 dimensional pattern pointed by $y_{01}$ is multiplied to the input block. Similarly, for the output $y_{01}$ of the (01) index, the cosine weight is multiplied only in the y direction; and subsequently, the weight is multiplied in both directions for $y_{11}$ and $y_{22}$. As a result, signal components having a particular correlation are extracted from the video signal so as to be supplied to the respective outputs $\{y_{ij}\}$. Since the self-correlation of the video signal is high, there occurs rarely a case where the signal abruptly changes in an input image signal block. In consequence, there rarely takes place the cases of $y_{11}$ and $y_{22}$ for which the matching condition appears for an abruptly changing pattern, and as a result, outputs of the lower degrees ($y_{00}$, $y_{01}$, $y_{10}$, etc.) are developed as large values. It is therefore possible to allocate a greater number of bits for quantizing the 2D-DCT outputs of the lower degree and to progressively reduce the number of bits for the 2D-DCT outputs of the higher degree, thereby accomplishing a highly efficient quantization (bandwidth compression). FIG. 19 shows a concrete example of the two-dimensional DCT for a input image block with a size of 4×4 pixels. From the two-dimensional data of (A) of FIG. 19, a block including 4×4 pixels is separated so as to be subjected to the DCT operation. The computation algorithm thereof is shown in (B) of FIG. 19. Through this operation, there are attained 4×4=16 outputs associated with indices ranging from (0, 0) to (3, 3). By using the correlational characteristic of the video information, quantization bits are allocated to the respective indices as shown in (C) of FIG. 19. As a result, an information density of 8 bits/pixel of the original signal is compressed into an information density of 2.25 bits/pixel. In addition, it is possible to increase the reduction ratio by increasing the input block size of the DCT.

In the two-dimensional DCT, a one-dimensional DCT is first effected by use of the embodiment described above such that the results of the DCT operation conducted on a plurality of lines are stored in a memory to form a data matrix and then to effect a transposition of the data matrix through an address translation or the like; thereafter, a one-dimensional DCT is effected thereon so as to implement the two-dimensional DCT With this method, there are required periods of time, for example, to transfer data to the one-dimensional DCT and to achieve the address translation on the data thereafter. Therefore, a high-speed processing cannot be carried out by use of the pipeline processing or the like.

In addition, when increasing the input block size, it is necessary to increase the number of coefficient memories and accumulators in the system of the patent described above. However, for a multiply/accumulate section including a multiplier circuit and adder circuit, the amount of data to be processed is increased and hence the DCT processing speed is lowered.

In the following embodiment, a pipeline processing is implemented by means of a combination of a delay circuit and a plurality of DCT circuits such that the input block size of the DCT is increased and/or the two-dimensional DCT is processed without decreasing the throughput speed. Incidentally, this technology is also applicable to other transformations such as a high-speed Fourier transformation and a coordinate transformation.

Figure 11:
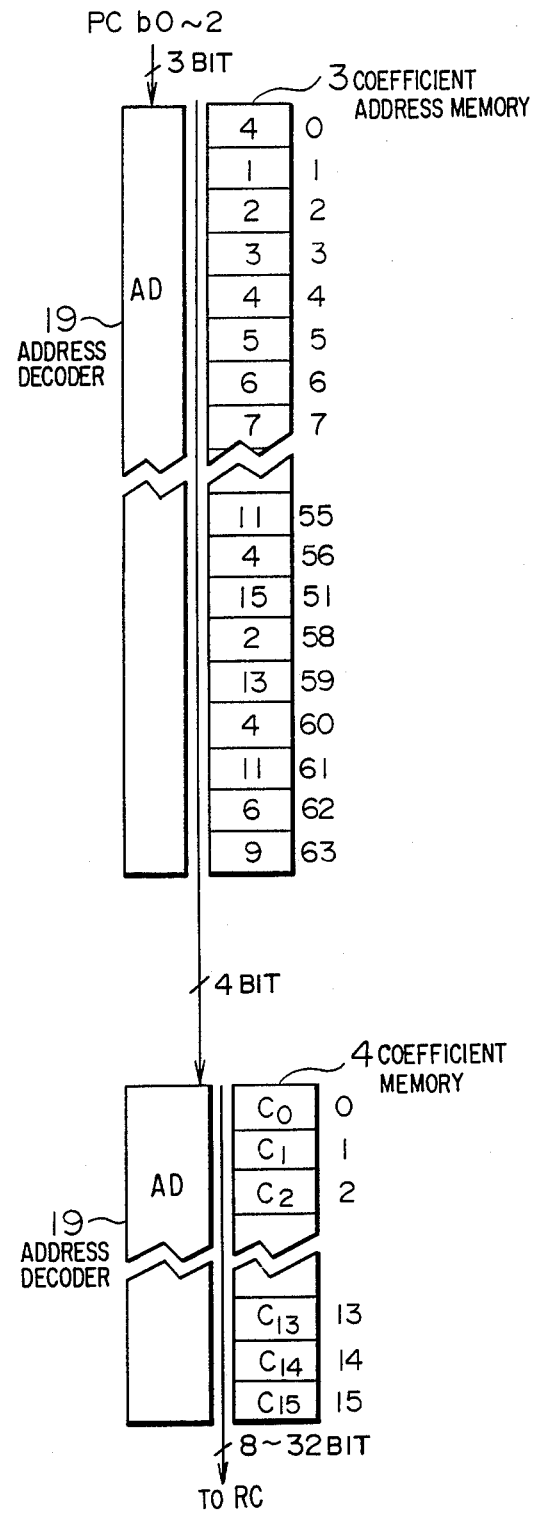
FIG. 11 is a schematic diagram showing a coefficient address memory and a coefficient memory utilized in the embodiment according to the present invention.
Figure 12A:
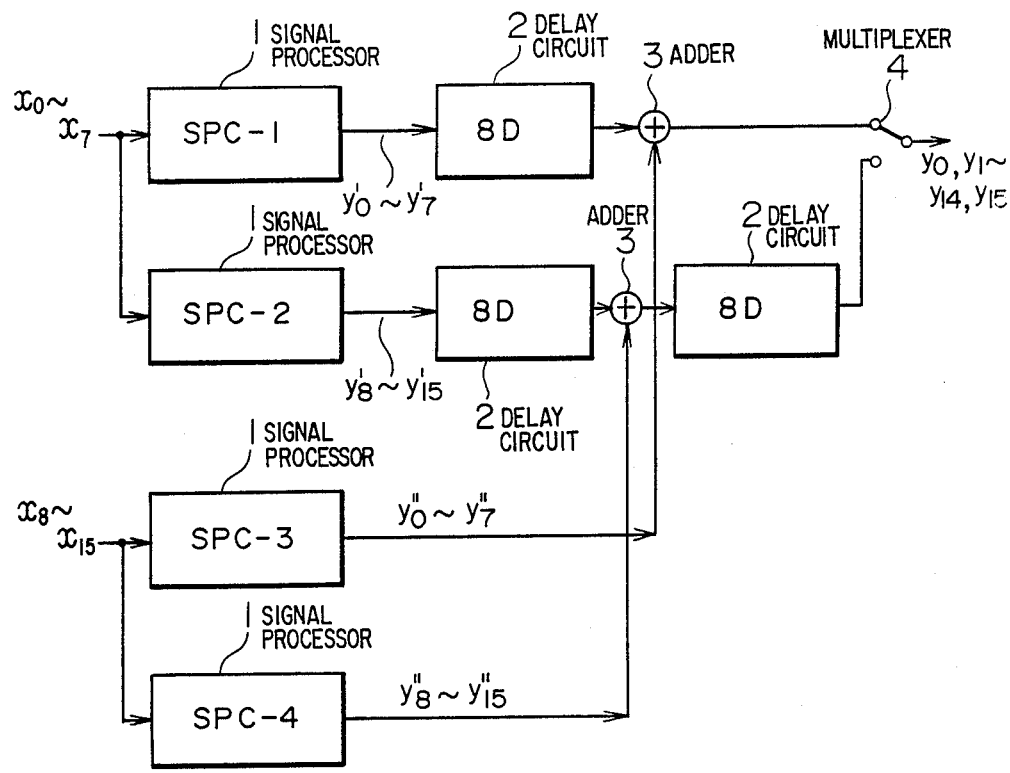
FIGS. 12A and 12B are block diagrams showing a multiprocessor system as an alternative embodiment according to the present invention.
Figure 12B:
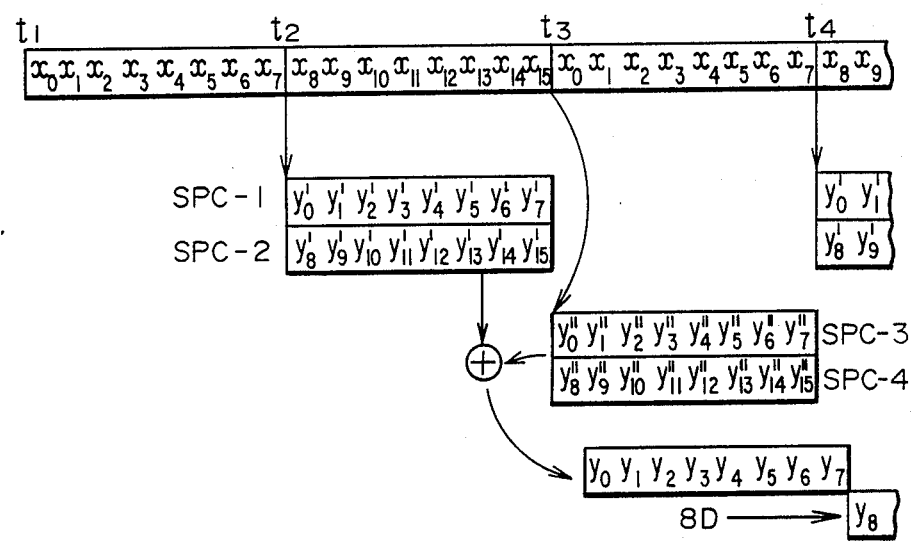
Figure 21:
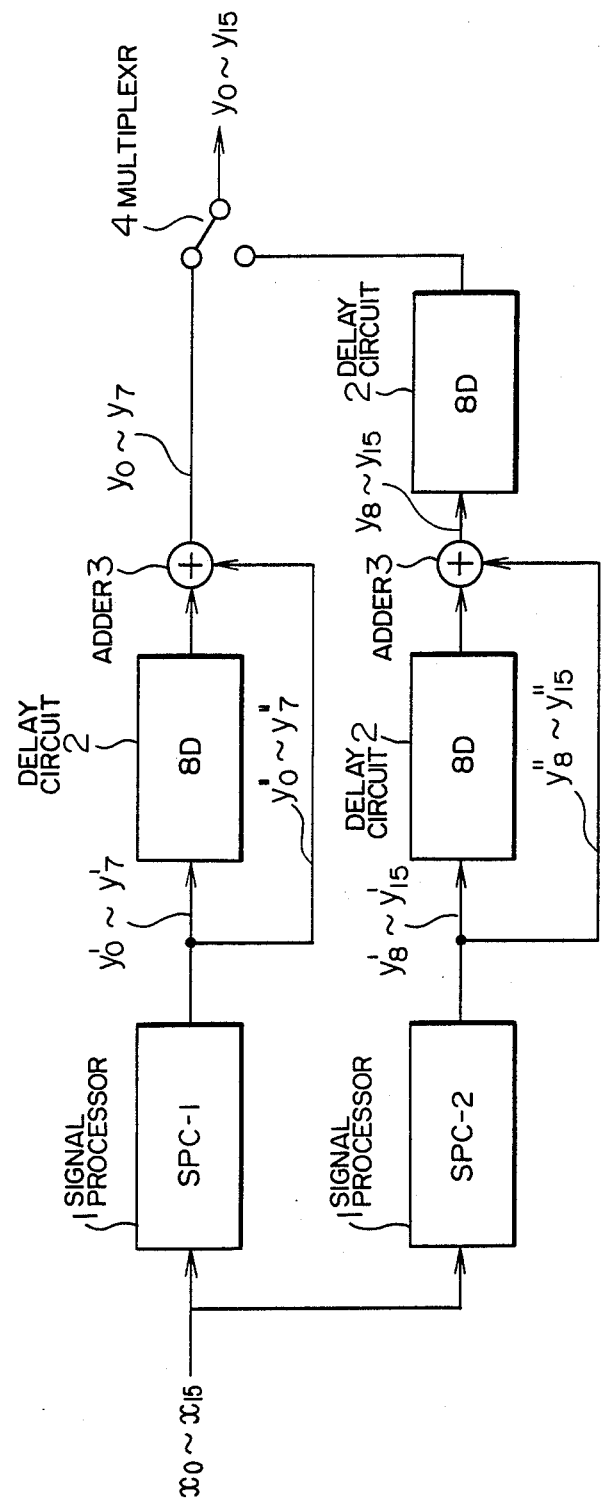
FIGS. 21 and 22 are diagrams showing alternative embodiments in which the number of circuits are reduced to half the original number.

FIGS. 12A and 12B show an embodiment in a case where the block size of the DCT is increased. In this system, a signal processing core (SPC) is, as already shown in the embodiment described with reference to drawings up to FIG. 11, a signal processor which executes a discrete cosine transformation (DCT) processing, and the block size is eight in the example of FIG. 12. By employing two units of this configuration, the system can process a block of size 16. FIG. 20 shows a mathematic expression representing the DCT processing for a block size of 16. Here, the matrix to be multiplied is split into four partitions, which are respectively assigned to four SPCs In the constitution of FIGS. 12A and 12B, the processing is to be executed in a pipeline fashion so as to prevent the throughput of input and output operations from being lowered by doubling the size of the block Next, the operation of the system will be described. As shown in FIG. 12B, the signals $\{x_k\}$ (k=0 to 15) are serially supplied from the input terminal From time $t_1$, data of $x_0$ to $x_7$ are inputted to SPC-1 and SPC-2 such that results obtained by executing the DCT with a block size of eight thereon, namely, $y_0'$ to $y_7'$ and $y_8'$ to $y_{15}'$ are delivered as outputs at the timing identical to that of the inputs $x_8$ to $x_{15}$. In addition, from time $t_2$, input data of $x_8$ to $x_{15}$ are fed to SPC-3 and SPC-4 such that the respective outputs $y_0''$ to $y_7''$ and $y_8''$ to $y_{15}''$ are added to the signals beforehand outputted from SPC-1 and SPC-2 which are delayed by eight sampling periods of time, thereby attaining the outputs $y_0$ to $y_{15}$. Here the coefficient address memory of each SPC is 16 words and the coefficient address memory is of a capacity of 64 words. In the circuit configuration of FIG. 12A, each SPC is idling half the time. By multiplying the coefficient memory capacity by two and increasing the coefficient address memory capacity to 256 words, the number of SPCs of the circuit can be reduced to half of FIG. 12A. The resultant circuit is shown in FIG. 21. Here two SPCs is working all the time effectively.

Figure 22:
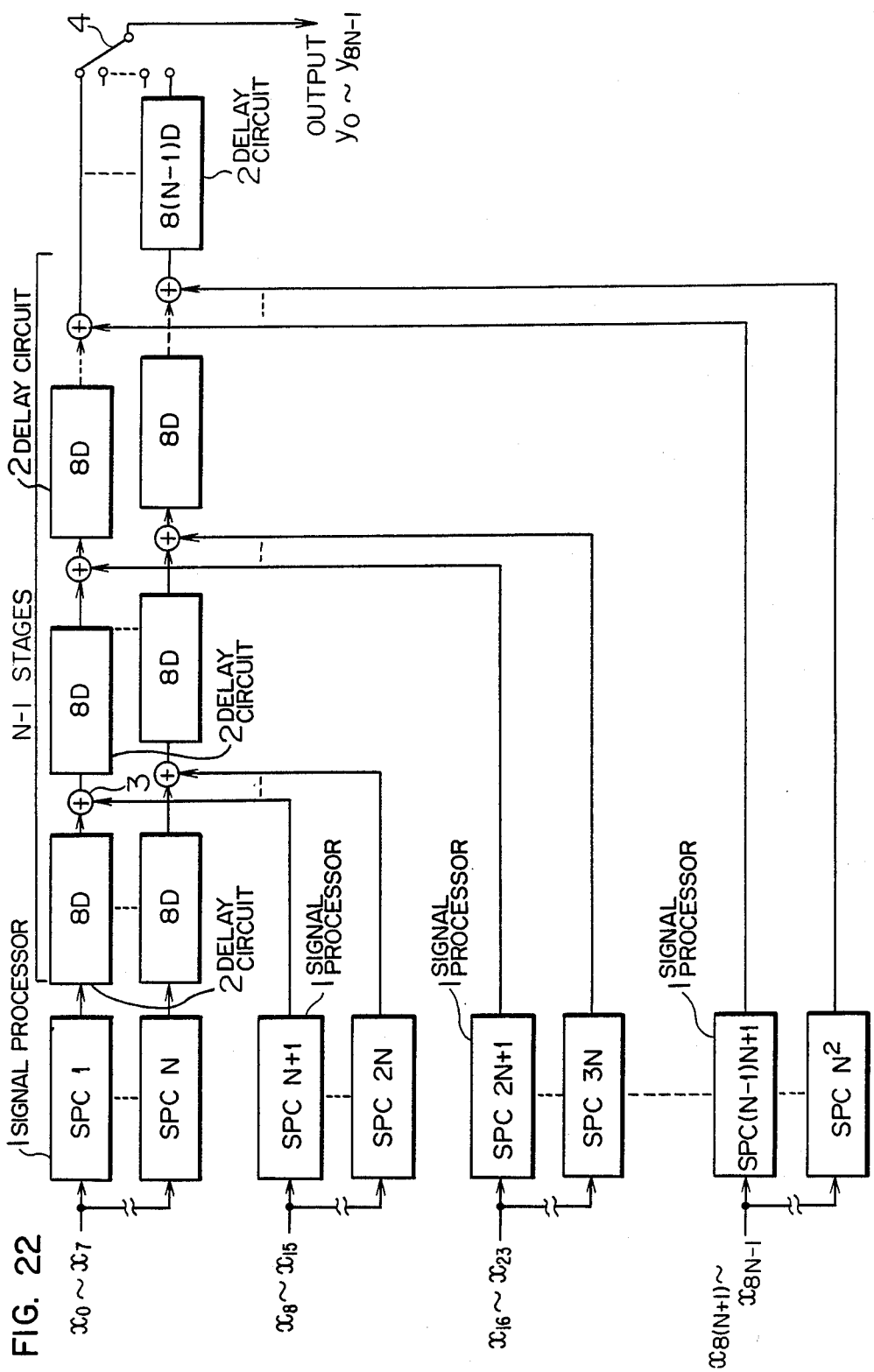

The method above is applicable not only to the doubling but also generally to the expansion multiplied by N. FIG. 22 shows a configuration which is implemented by expanding the degree of the system of FIG. 1 by multiplying by N. Also in this case, since the pipeline processing is employed, there does not appear any decrease in the throughput speed of the data input/output operations However, the delay associated with the pipeline is 8 (N−1) sampling periods of time.

Figures 13A, 13B:
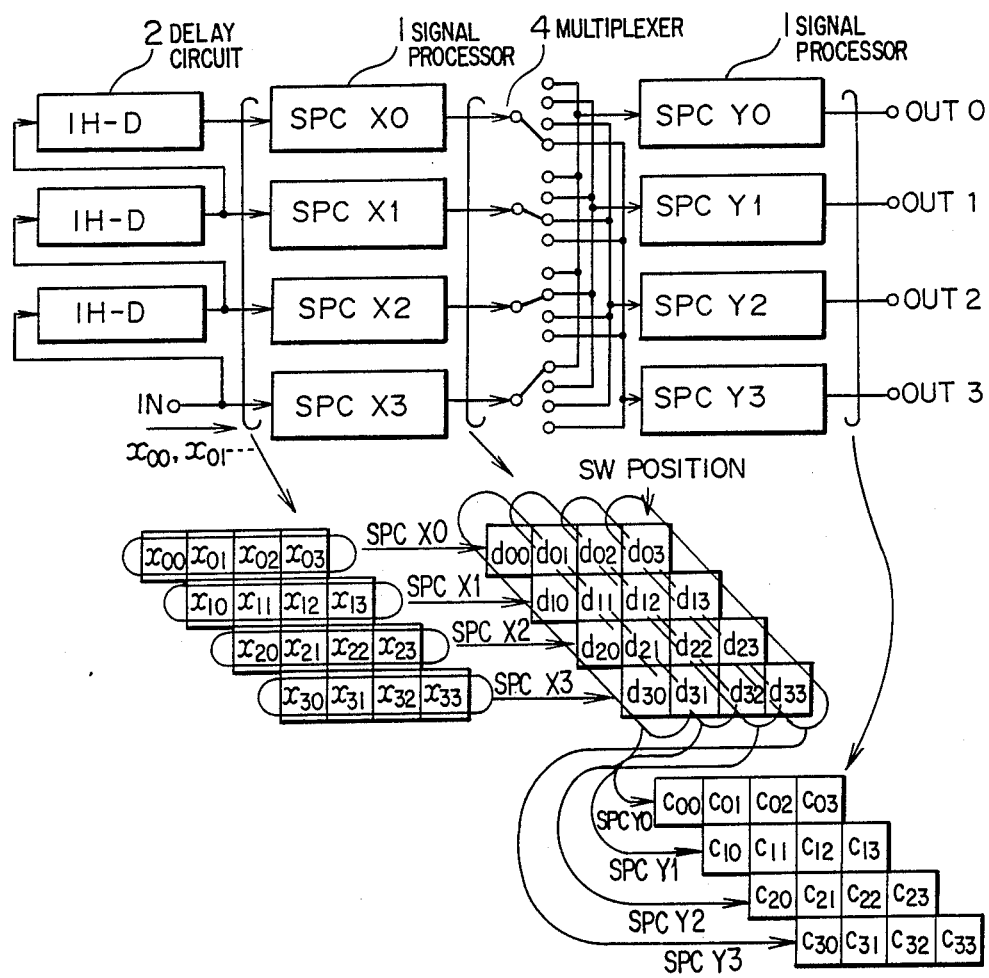
FIGS. 13A and 13B are schematic block diagrams showing still an alternative embodiment suitable for a high-speed 2 dimensional DCT operation according to the present invention.

FIG. 13 shows the second embodiment according to the present invention. This system includes a multiprocessor system processing a two-dimensional DCT. For simplification, it is assumed that each SPC executes a DCT processing with a block size of four. According to this system, there is implemented a two-dimensional, 4×4 DCT processing. First, video signals $X_{ij}$ are inputted from the input terminal in an order of $x_{00}$ to $x_{0n}$, $x_{10}$ to $x_{1n}$, ..., $x_{m0}$ to $x_{mn}$, where m indicates a vertical position of a two-dimensional image and n denotes a horizontal position thereof. The input signals are supplied to delay circuits 2 respectively connected in series. In this circuit, each delay circuit then realizes a delay operation of (n−1) sampling periods of time. Each delay circuit produces an output, which is fed to the first group of SPC X0 to SPC X3 as shown in FIG. 13B. The input data and timing are shown in FIG. 13B. These SPCs constituting the first group accomplish the one-dimensional DCT processing associated with the expression (1) of FIG. 13A. An output $d_{pq}$ therefrom is shifted by a sampling period of time at the timing of FIG. 13B. Subsequently, as shown in the expression (2) of FIG. 13A, the matrix $d_{pq}$ is transposed for an execution of the one-dimensional DCT of the second half portion thereof, which is achieved by a multiplexer 4 of FIG. 13B. According to the timing of $d_{pq}$ shown in FIG. 13B, data is successively supplied to the next stage, namely, the second group of SPC Y0 to SPC Y3 so as to enable the pipeline processing to be executed. The final two-dimensional DCT outputs $c_{ij}$ are delivered at the timing of FIG. 13C. The obtained signals are delivered to a quantizer so as to enable the video signal bandwidth compression.

The system above can be easily expanded. In addition, for an expansion of the block size, it is also possible to combine the embodiment of FIGS. 12A and 12B with this system.

Moreover, as already described with reference to the embodiment by use of the drawings up to FIG. 11, since the coefficients of the SPCs can be rewritten, an adaptive DCT processing is also possible.

In this method, although the flow of signals is clear, there exists a problem that the signal processing speed is too high for an actual application. That is, since four scanning lines are simultaneously processed in a scan processing period associated with one scanning line, the operation of the processor is stopped during the remaining three scanning lines In this situation, a further efficient method of constituting a multiprocessor system will be described in conjunction with the following embodiment.

Figure 14:
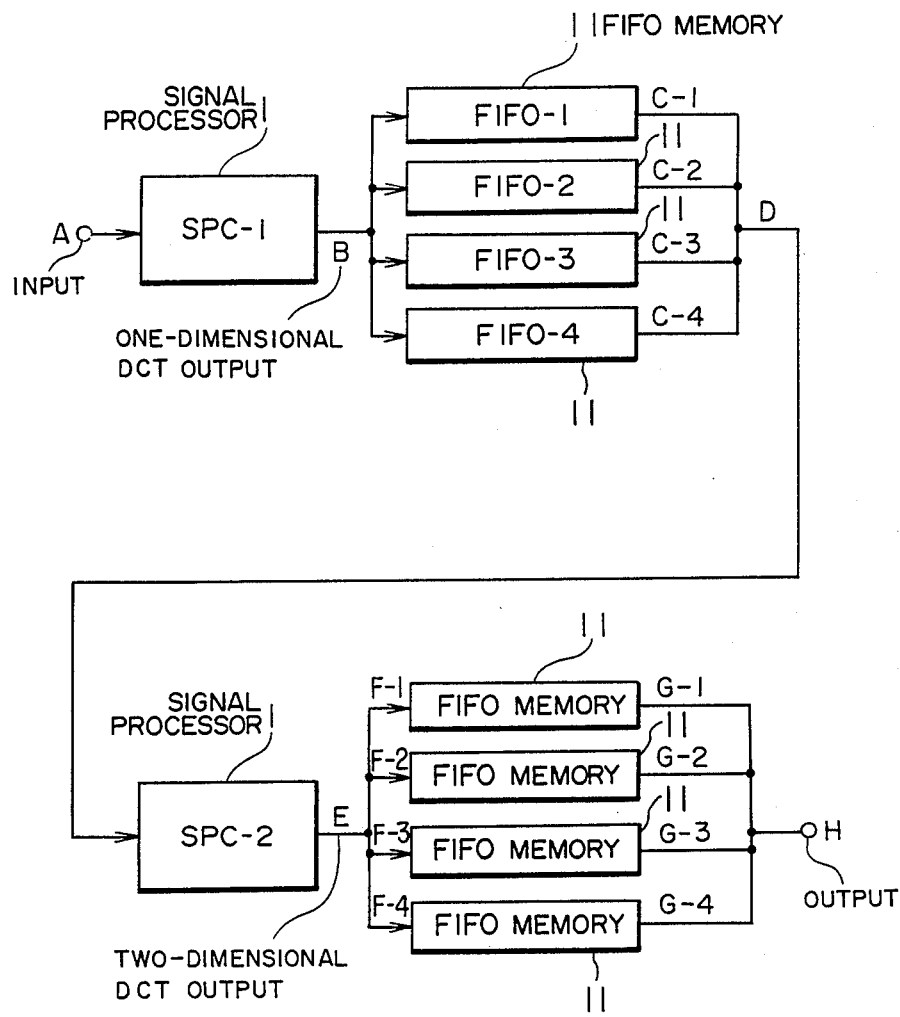
FIG. 14 is a schematic diagram showing still an alternative embodiment according to the present invention.

In this embodiment, as shown in FIG. 14, SPC-1 sequentially conducts a one-dimensional DCT processing on an input signal A. The SPC-1 produces an output B so as to deliver, although delayed by four cycles through the pipeline processing in the SPC, outputs $\{d_{ij}\}$ of the one-dimensional DCT for each sampling clock. The outputs are connected to four First in First out (FIFO) memories 11, more concretely, the translation outputs respectively associated with the first, second, third, and fourth scanning lines are written in the FIFO-1, FIFO-2, FIFO-3, and FIFO-4, respectively. Each FIFO has a maximum storage capacity equivalent to the pixels included in one horizontal scanning line. In the scanning of a block in the next stage, data is written again beginning from the FIFO-1. For each FIFO, one write operation is achieved only for every four horizontal scanning operations, and the write operation is not effected in the remaining three horizontal scanning periods.

Each FIFO conducts a read operation of a data item for every four sampling clocks. During one clock in the four sampling block periods, the data item is outputted, whereas a high-impedance state is set during the remaining three clock periods By reading out these data items at the timing indicated by C-1 to C-4 of FIGS. 15A and 15B, the terminal D is supplied with a serial output of the one-dimensional DCT results of a block (4×4 pixels) for a period of 16 clocks in a consecutive fashion. In this way, the one-dimensional DCT data is transposed. Through the operation above, the results of the horizontal scanning of 4×4 blocks are outputted for four horizontal scanning periods (4H).

Figure 15A:
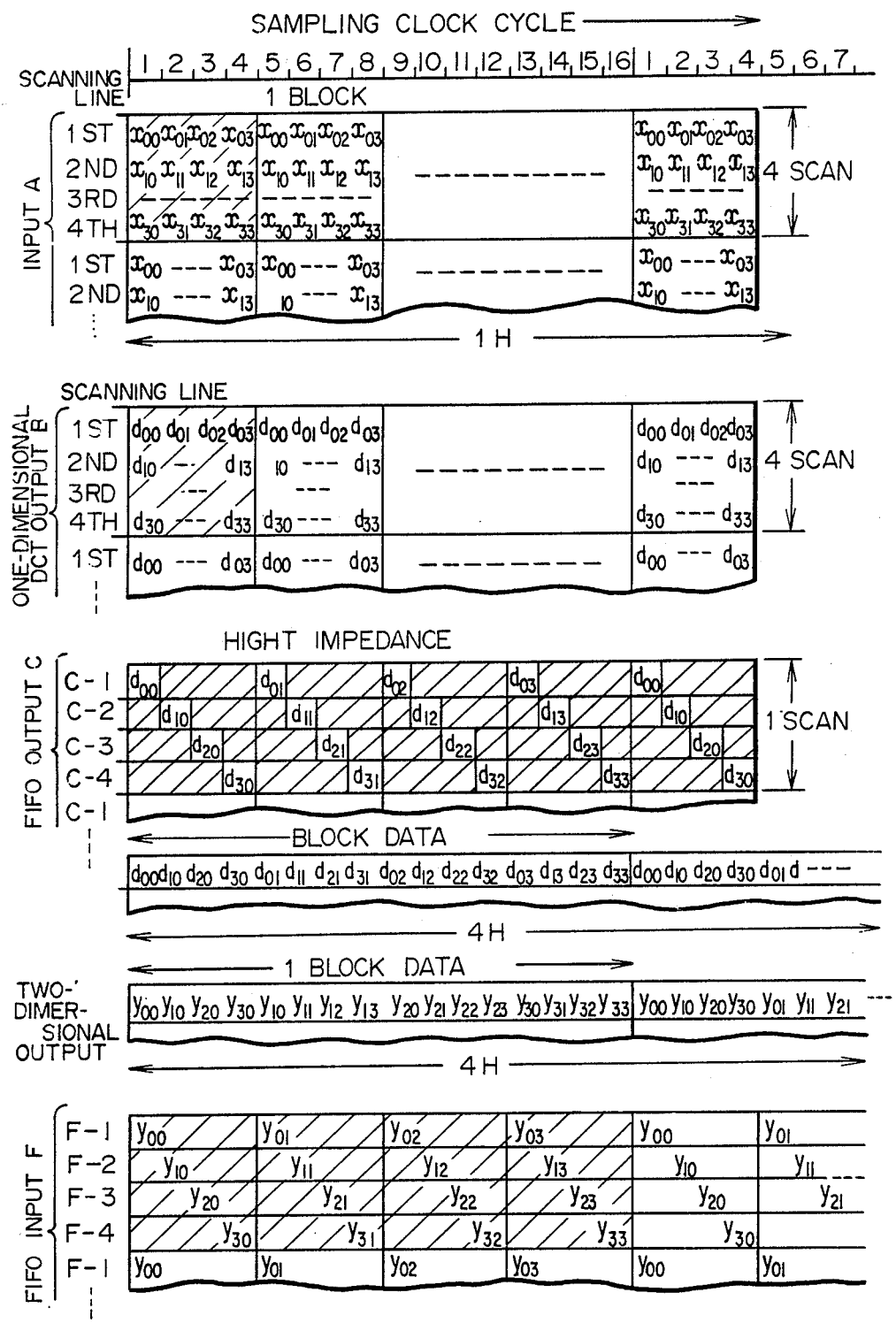

Next, the one-dimensional DCT result is subjected to the two-dimensional DCT operation in the subsequent SPC-2, which delivers an output E to be supplied to the second FIFO array so as to be written therein at the timing indicated as F-1 to F-4 of FIG. 15A.

From the second FIFO array, data items are read out at the timing of G-1 to G-4 of FIG. 15B; as a result, the timing of the two-dimensional DCT output becomes to be identical to that of the input A.

According to this method, there are employed two SPCs and 2n FIFO memories so as to enable the real-time DCT with a block size of n×n to be processed.

In the SPC, there are required 2n words for the coefficient memory and $n^2$ words for the coefficient address memory.

Figure 16A:
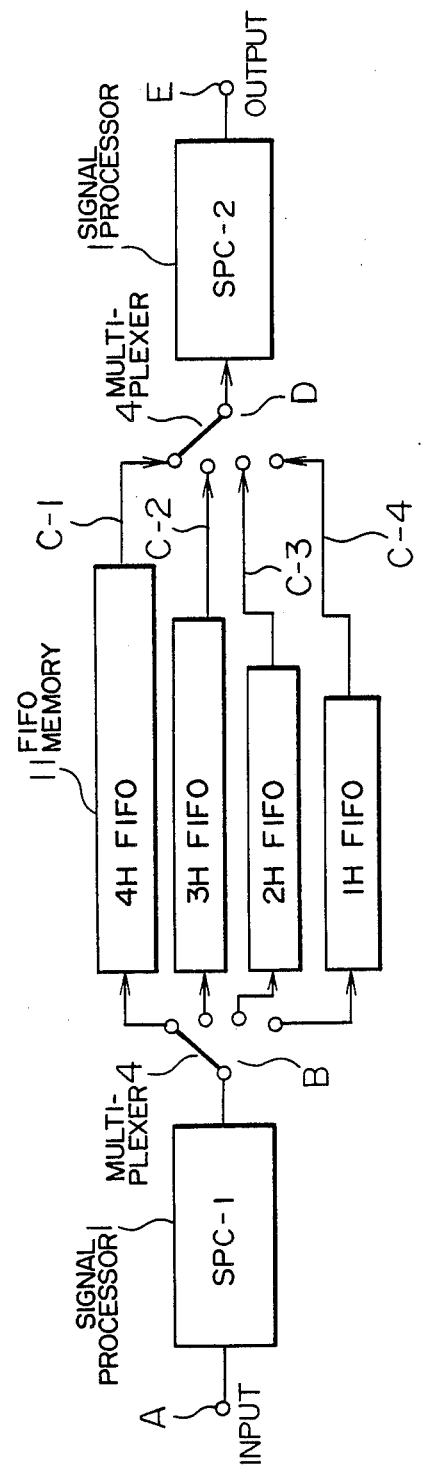

In the next embodiment, as shown in FIGS. 16A and 16B, the first SPC-1 sequentially carries out the one-dimensional DCT operation on the input signal A. The SPC-1 produces an output B so as to deliver, although delayed by four cycles, outputs $\{d_{ij}\}$ of the one-dimensional DCT for each input of a pixel $\{x_{ij}\}$. The outputs B are distributed through a multiplexer 4 to four kinds of FIFOs, which possess capacities of 4H, 3H, 2H and 1H, respectively. Here, 1H indicates the number of pixels included in a horizontal scanning line. Namely, the translation outputs respectively associated with the first, second, third, and fourth scanning lines are distributed to the 4H FIFO, 3H FIFO, 2H FIFO, and 1H FIFO, respectively. For each FIFO, one write operation is achieved only for every four horizontal scanning operations. In addition, complex FIFO function for 1H length is sufficient for each line, and hence line memory can be used for the remaining delay. For example, the 4H FIFO can be implemented by use of a 1H FIFO and 3H line memory. The FIFO outputs a pixel signal every four cycles, that is, each FIFO outputs information of a scanning line each time four lines are scanned The timing of this operation is determined as shown by C-1 to C-4. The outputs are arranged by use of the multiplexer as indicated by D in FIG. 16A, which means that the data has been transposed. The obtained data is subjected to the one-dimensional DCT operation in the second SPC-2 so as to complete the two-dimensional DCT. In this method, the DCT of degree of n×n can be accomplished only by using two SPCs, line memories for $(n-1) \cdot n/2$, and n FIFO memories In this case, however, there are required 2n words for the coefficient memory and $n^2$ words for the coefficient address memory.

FIGS. 17A and 17B show an alternative embodiment according to the present invention in which a coefficient matrix $c_{ij}$ is multiplied by the input signals Y, I, and Q according to expression (3) so as to attain outputs R, G, and B. The respective input and output signals are updated for each sampling time. For the input signals Y, I, and Q, there are assigned no delay, a delay of one sampling period of time, and a delay of two sampling periods of time, respectively With this provision and by means of the multiplexer 4, it is possible to sequentially supply SPC 1 to SPC 3 with a set of data items including $Y_i$, $I_i$, and $Q_i$ developed at each sampling time. These SPCs conduct the respective operations of obtaining products between vectors so as to sequentially output data items of $R_i$, $G_i$, and $B_i$. The resultant outputs are fed to the multiplexer 4, which in turn selects only the signals related to R, G, and B and applies an appropriate delay thereto so as to produce the signals R, G, and B with an appropriate timing therebetween.

The processing above is also applicable to a product between a matrix and a vector with an increased number of inputs.

Figure 23:
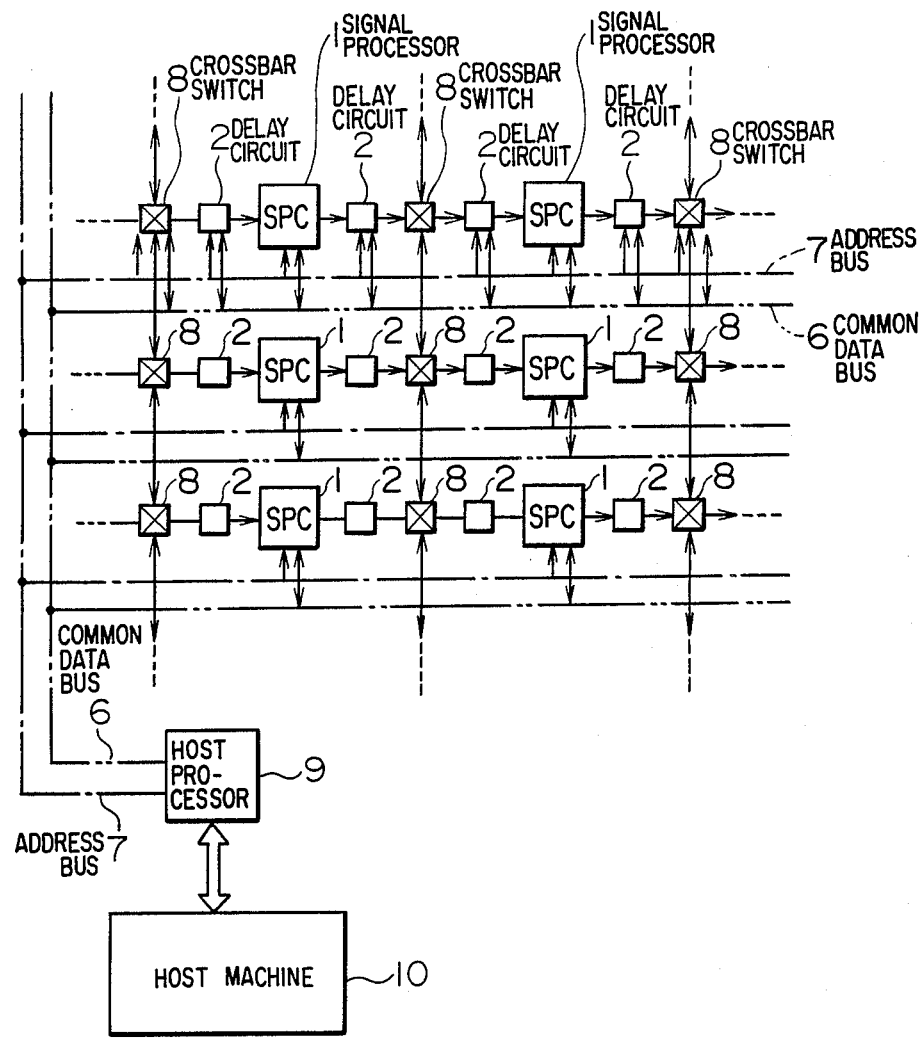
FIG. 23 is a block diagram showing still an alternative embodiment in which the present invention is applied in a generalized form.

In addition, the embodiments above can be generalized as shown in FIG. 23. In this configuration, the program and the coefficient data of each SPC are set by use of the common data bus 6 and the address bus 7. Moreover, wirings between the SPCs are to be fixed or to be programmable by means of a crossbar switch 8 shown in FIG. 23. For the structure of the array, there can be considered, in addition to the crossbar system, such structures as a common bus, a tree, a mesh, a shuffle, and a super cubic lattice. These SPCs 1 and the crossbar switches 8 are controlled by the host processor 9; furthermore, the host processor 9 is controlled by an external host machine 10. In addition, it is also possible in some cases that the amount of delay of the delay circuit 2 and the connections thereof to be arranged in the periphery of the respective SPCs are also set to be programmable According to the present invention, a discrete cosine transformation as well as a product between a matrix and a vector can be computed at a high speed by use of a small number of multipliers and adders. For example, in a case of an operation of a one-dimensional discrete cosine transformation with the block size of eight, the conventional algorithm requires a processing period of time of 37 steps; in contrast thereto, according to this method, by executing the pipeline processing in a regular fashion, the processing of each sample can be processed each step. (The delay is eight steps ) In addition, by combining the control memory with macro step control instructions, the number of memory words can be reduced from 64 words to eight words. Furthermore, by accessing the coefficient memory through the coefficient address memory, for a data width of eight bits, the memory can be reduced from 8×64 bits=512 bits to 8×8+3×64=256 bits.

In addition, according to the present invention, it is possible to expand the block size of the DCT processing and to expand the operation thereof to the two-dimensional operation without lowering the processing speed. Moreover, the processing is also applicable to the general operation to obtain a product between a matrix and a vector.

While particular embodiments of the invention have been shown and described, it will be obvious to those skilled in the art that various changes and modifications may be made without departing from the present invention in its broader aspects.

What is claimed is:

1. A digital signal processor for computing a vector product between a column vector input signal including a plurality of data items and a matrix including predetermined number of coefficient data items so as to produce a column vector output signal including a plurality of data items, said processor comprising:
   (1) input means for serially receiving said plurality of data items of the column vector input signal;
   (2) first store means for storing therein in a first cycle the data items received by said input means;
   (3) coefficient memory means for storing therein the predetermined number of coefficient data items of the matrix;
   (4) second store means for reading from said coefficient memory means data items in a direction of a row of the matrix among the predetermined number of coefficient data items in a second cycle shorter in time than the first cycle so as to store therein the data items thus read from said coefficient memory means;

(5) multiply means for multiplying the data items outputted from said first store means by data items delivered from said second store means;

(6) third store means connected to an output from said multiply means;

(7) add means having a first input connected to an output from said third store means;

(8) fourth store means having an output connected to a second input of said add means; and (9) accumulator means having an input connected to an output from said add means and having an output connected to an input of said fourth store means.

2. A digital signal processor according to claim 1 wherein said coefficient memory means include inputs and outputs respectively including multiport memory means which can be accessed in an independent fashion.

3. A digital signal processor according to claim 1, further comprising:

(10) buffer means having an input connected to the output of said add means,

(11) fifth store means for storing therein output data from said buffer means, and

(12) output means, having an input connected to the output of said fifth store means, for serially outputting said plurality of data items of the column vector output signal.

4. A digital signal processing according to claim 1, further comprising:

coefficient address means connected to said coefficient memory means, wherein said coefficient memory means outputs coefficient data in response to addresses read out from said coefficient address means, and wherein said coefficient address means outputs said addresses with a timing of said second cycle.

* * * * *